United States Patent
Goodreau et al.

(10) Patent No.: US 6,802,913 B1
(45) Date of Patent: Oct. 12, 2004

(54) COMPOSITION AND PROCESS FOR MULTI-PURPOSE TREATMENT OF METAL SURFACES

(75) Inventors: Bruce H Goodreau, Romeo, MI (US); Thomas J Prescott, Troy, MI (US)

(73) Assignee: Henkel Kommanditgesellschaft aut Aktien, Duesseldorf (DE)

(*) Notice: Subject to any disclaimer, the term of this patent is extended or adjusted under 35 U.S.C. 154(b) by 0 days.

(21) Appl. No.: 09/529,564

(22) PCT Filed: Oct. 13, 1998

(86) PCT No.: PCT/US98/20933

§ 371 (c)(1),
(2), (4) Date: Apr. 14, 2000

(87) PCT Pub. No.: WO99/19083

PCT Pub. Date: Apr. 22, 1999

Related U.S. Application Data

(60) Provisional application No. 60/062,095, filed on Oct. 14, 1997.

(51) Int. Cl.[7] ............................ C08K 3/32; B05D 3/12; C23C 22/00
(52) U.S. Cl. ................. 148/251; 148/253; 427/327; 427/388.4; 427/435; 427/354; 524/417; 524/430; 524/547
(58) Field of Search ................. 148/251, 253; 427/327, 388.4, 435, 354; 524/417, 430, 547

(56) References Cited

U.S. PATENT DOCUMENTS

| | | | |
|---|---|---|---|
| 4,376,000 A | 3/1983 | Lindert | 148/6.15 R |
| 4,433,015 A | 2/1984 | Lindert | 427/388.4 |
| 4,457,790 A | 7/1984 | Lindert et al. | 148/6.15 R |
| 4,517,028 A | 5/1985 | Lindert | 148/6.14 R |
| 4,970,264 A | 11/1990 | Lindert et al. | 525/328.8 |
| 5,068,299 A | 11/1991 | Lindert et al. | 526/313 |
| 5,116,912 A | 5/1992 | Lindert et al. | 525/340 |
| 5,298,289 A * | 3/1994 | Lindert et al. | 427/388.4 |
| 5,378,291 A * | 1/1995 | Ara et al. | 148/251 |
| 5,584,946 A | 12/1996 | Karmaschek et al. | 148/247 |
| 5,868,872 A | 2/1999 | Karmaschek et al. | 148/247 |

FOREIGN PATENT DOCUMENTS

| | | |
|---|---|---|
| DE | 4317217 | 12/1994 |
| DE | 4412138 | 10/1995 |
| EP | 0812933 | 12/1997 |
| FR | 2255393 | 7/1975 |
| GB | 1486820 | 9/1977 |
| WO | 90 12902 | 11/1990 |
| WO | 95 09934 | 4/1995 |
| WO | 95 33869 | 12/1995 |
| WO | 96 07772 | 3/1996 |
| WO | 97 04145 | 2/1997 |

* cited by examiner

*Primary Examiner*—Peter D. Mulcahy
(74) *Attorney, Agent, or Firm*—Stephen D. Harper; Mary K. Cameron

(57) ABSTRACT

A multipurpose treatment composition for metal surfaces comprises phosphate ions, fluorometallate ions, water soluble polymers containing substituted aminomethylene moieties bonded to benzene rings which also have an oxygen atom bonded to another carbon atom in the same ring, and a distinct kind of film-forming polymer. The compositions are free from chromium and other heavy metals that cause serious pollution problems in some prior art treatment compositions. Coating layers formed in a process according to the invention are effective for at least three different purposes: increasing adhesion of and corrosion protection from subsequently applied paints or other protective coatings with a largely organic matrix; without any subsequently applied protective coating, providing at least temporary protection against staining and development of white rust on zinc or zinc alloy surfaces treated in a process according to the invention, and providing sufficient lubricity to permit roll forming of sheet metals treated in a process according to the invention without the need for additional liquid lubricants such as oil.

21 Claims, No Drawings

COMPOSITION AND PROCESS FOR MULTI-PURPOSE TREATMENT OF METAL SURFACES

This application claims the benefit of Provisional application Ser. No. 60/062,095, filed Oct. 14, 1997.

BACKGROUND OF THE INVENTION

This invention relates to aqueous liquid compositions and processes using such liquids for chemically treating metal surfaces to form a coating layer thereon. The compositions are free from chromium and other heavy metals that cause serious pollution problems in some prior art treatment compositions. Coating layers formed in a process according to the invention can be effective for at least three different purposes: increasing adhesion of and corrosion protection from subsequently applied paints or other protective coatings with a largely organic matrix; without any subsequently applied protective coating, providing at least temporary protection against staining and development of white rust on zinc or zinc alloy surfaces treated in a process according to the invention; and providing sufficient lubricity to permit roll forming of sheet metals treated in a process according to the invention without the need for additional liquid lubricants such as oil.

Traditionally, most zinciferous and/or aluminiferous surfaces have been passivated by chemical treatment with aqueous liquid compositions containing at least some hexavalent chromium. Concerns about environmental pollution have led in recent years to development and disclosure of some chromium-free treatments. However, there is still room for further improvements with respect to, among other things, cost, ease of use, and versatility of coatings formed. Conventional rolling oil lubricants also can cause pollution, cost, and fire hazard problems.

Various alternative and/or concurrent objects of this invention are: (i) to provide an entirely or substantially chromium-free composition and process for passivating that will provide an adequate corrosion resistance in comparison with previously used high quality chromate containing passivating agents; (ii) to provide an economical passivating treatment; (iii) to reduce pollution potential; (iv) to provide a solid coating that provides adequate lubrication for roll forming of sheet metal without the need for supplemental organic liquid lubricant; (v) to provide paint-adhesion improvements by the same coating as is used for passivating; and (vi) to reduce costs of overall operations.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, throughout this specification, unless expressly stated to the contrary: percent, "parts of", and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not preclude chemical interactions among the constituents of a mixture once mixed; specification of materials in ionic form implies the presence of sufficient counterions to produce electrical neutrality for the composition as a whole; any counterions thus implicitly specified should preferably be selected from among other constituents explicitly specified in ionic form, to the extent possible; otherwise such counterions may be freely selected, except for avoiding counterions that act adversely to the objects of the invention; the terms "molecule" and "mole" and their grammatical variations may be applied to ionic, elemental, or any other type of chemical entities defined by the number of atoms of each type present therein, as well as to substances with well-defined neutral molecules; the first definition of an acronym or other abbreviation applies to all subsequent uses herein of the same abbreviation and applies mutatis mutandis to normal grammatical variations of the initially defined abbreviation; the term "paint" includes all like materials that may be designated by more specialized terms such as lacquer, enamel, vanish, shellac, topcoat, and the like; and the term "polymer" includes "oligomer", "homopolymer", "copolymer", "terpolymer", and the like.

BRIEF SUMMARY OF THE INVENTION

It has been found that one or more of the objects stated above for the invention can be achieved by use of an aqueous liquid composition that comprises, preferably consists essentially of, or more preferably consists of, water and:

(A) a concentration of a component of dissolved phosphorus-containing anions;

(B) a concentration of a dissolved component selected from the group consisting of simple and complex anions containing fluorine atoms;

(C) a concentration of a component of dissolved and/or stably dispersed organic molecules including phenolic ring moieties with aminomethyl substituents thereon as more fully described in one or more of the following U.S. Patents, all of which, except for any content that may be inconsistent with any explicit statement herein, are hereby incorporated herein by reference: U.S. Pat. No. 4,376,000 of Mar. 8, 1983 to Lindert; U.S. Pat. No. 4,433,015 of Feb. 21, 1984 to Lindert; U.S. Pat. No. 4,457,790 of Jul. 3, 1984 to Lindert; U.S. Pat. No. 4,517,028 of May 14, 1984 to Lindert; U.S. Pat. No. 5,116,912 of May 26, 1992 to Lindert et al.; U.S. Pat. No. 5,068,299 of Nov. 26, 1991 to Lindert et al.; and U.S. Pat. No. 4,970,264 of Nov. 13, 1990 to Lindert et al.; and (D) a concentration of a component of dissolved, stably dispersed, or both dissolved and stably dispersed film-forming molecules, said molecules not being part of any of immediately previously recited components (A) through (C); and, optionally, one or more of the following components:

(E) a concentration of a component of stably dispersed solid material that in isolated form has a coefficient of static friction, measured between two pieces of the solid material itself or between the solid material and cold rolled steel, that is not greater than 0.35, this solid material not being part of any of immediately previously recited components (A) through (D);

(F) a component of surfactant and/or of dispersing agent for one of components (D) or (E) that is not part of any of immediately previously recited components (A) through (E);

(G) a component of preservative agent that is not part of any of immediately previously recited components (A) through (F); and (H) a component of colorant that is not part of any of immediately previously recited components (A) through (H).

The phrase "stably dispersed" when used herein to describe an insoluble component in a liquid continuous phase, as in the definitions of components (C), (D), and (E) recited above, means that the insoluble component is not spontaneously concentrated into any separate liquid or solid phase perceptible with unaided human vision to be distinct from, but in contact with, the liquid continuous phase within a period of observation of the combination of stably dispersed insoluble component and liquid continuous phase for 10 hours, or preferably, with increasing preference in the order given, for 1, 3, 5, 10, 30, 60, 90, 120, 240, or 360 days when stored without mechanical disturbance at 20° C. in dispersed form. Molecules are to be understood as "film forming" for the purposes of this description if, when a homogeneous solution and/or suspension of the molecules in water containing at least 20% of the molecules is dried at a temperature of at least 25° C. from a liquid film thickness not greater than 1 millimeter, a continuous and coherent film that is solid at 25° C. is produced.

Various embodiments of the;invention include working compositions for direct use in treating metals, make-up concentrates from which such working compositions can be prepared by dilution with water and/or by mixing with other concentrate compositions, replenisher concentrates suitable for maintaining optimum performance of working compositions according to the invention, processes for treating metals with a working composition according to the invention, and extended processes including additional steps that are conventional per se, such as cold working, cleaning, rinsing, and subsequent painting or some similar overcoating process that puts into place an organic binder-containing protective coating over the metal surface treated according to a narrower embodiment of the invention. Articles of manufacture including surfaces treated according to a process of the invention are also within the scope of the invention.

BRIEF DESCRIPTION OF THE SEVERAL VIEWS OF THE DRAWING

Not applicable.

DETAILED DESCRIPTION OF THE INVENTION

Component (A) is preferably selected from oxygen containing anions in which phosphorus is in its +5 oxidation state. Any oxyacid of phosphorus(V) and/or any salt thereof dissolved in an aqueous liquid composition according to the invention is to be understood for purposes of this description as supplying anions to the aqueous liquid composition to an extent of their full stoichiometric equivalent content, based on the phosphorus and oxygen atoms present, of: $HPO_3$; acids corresponding to the general formula $H_{(n+2)}P_nO_{(3n+1)}$, where "n" represents a positive integer; and/or complete and partial salts of all of these immediately previously recited acids, irrespective of whatever extent of ionization may actually occur in the solution. (It is generally believed in the art that all of these acids and/or their anions exist in potential equilibrium with one another, with the equilibrium having a strong preponderance of single-phosphorus-atom-containing entities at low temperatures and low concentrations in water and the entities containing a plurality of phosphorus atoms and the material conventionally written as $HPO_3$, regarded as a cyclic trimer with the actual formula $H_3P_3O_9$, becoming more predominant at high temperatures, high concentrations in water, or highly alkaline conditions in aqueous solutions.) At least for reasons of economy, ortho-phosphoric acid (i.e., $H_3PO_4$) and its salts are preferred as the source of component (A) in an aqueous liquid composition according to this invention, and the acid is usually preferred in view of the preferred acidic pH value for a working aqueous liquid working composition according to the invention.

Component (B) is preferably selected from the group consisting of anions with one of the chemical formulas $F^{-1}$, $HF_2^{-1}$, $BF_4^{-1}$, $AlF_6^{-3}$, $SiF_6^{-2}$, $TiF_6^{-2}$, $FeF_6^{-3}$, $ZrF_6^{-2}$, and $HfF_6^{-2}$. Within this group, the trivalent ions are less preferred than the others, the complex ions including boron, silicon, titanium, zirconium, or hafnium atoms are more preferred than the simpler anions containing only fluorine and optionally hydrogen, and the titanium-containing anions are most preferred. An acid or salt of an acid that contains the elements of one of the above noted chemical formulas of preferred anions is to be understood for purposes of this description as supplying such anions to an aqueous liquid working composition according to the invention in which it is dissolved to the full stoichiometric equivalent of the anions in the acid or salt, irrespective of whatever extent of actual ionization may occur in the solution. As with component (A), an acidic source for component (B) is normally preferred in view of the preferred acid pH of working compositions according to the invention. Irrespective of the source of the anions of component (B) present in an aqueous liquid composition according to the invention, if these anions contain a metallic element or boron, their concentration preferably is such that their total stoichiometric equivalent concentration of metallic elements and boron in moles per kilogram of the total composition, a concentration unit hereinafter usually abbreviated as "M/kg", has a ratio to the concentration of phosphorus atoms in M/kg that is stoichiometrically equivalent to the concentration of component (A) in the same composition that is at least, with increasing preference in the order given, 0.03:1.0, 0.06:1.0, 0.09:1.0, 0.12:1.0, 0.15:1.0, 0.18:1.0, 0.21:1.0, 0.24:1.0, 0.26:1.0, or 0.28:1.0 and independently preferably, is not more than, with increasing preference in the order given, 2.0:1.0, 1.5:1.0, 1.0:1.0, 0.8:1.0, 0.6:1.0, 0.50:1.0, 0.40:1.0, 0.35:1.0, or 0.30:1.0. If component (B) does not contain any boron or metal atoms, it preferably has a concentration stoichiometrically equivalent to a concentration of fluorine atoms in M/kg that has a ratio to a concentration of phosphorus atoms in M/kg that is stoichiometrically equivalent to the concentration of component (A) in the same composition that is at least, with increasing preference in the order given, 0.3:1.0, 0.5:1.0, 0.7:1.0, 0.9:1.0, 1.1:1.0, 1.3:1.0, 1.5:1.0, or 1.7:1.0 and independently preferably is not more than, with increasing preference in the order given, 7:1.0, 5:1.0, 4.0:1.0, 3.5:1.0, 3.2:1.0, 2.9:1.0, 2.6:1.0, 2.4:1.0, 2.2:1.0, 2.0:1.0, or 1.8:1.0.

Component (C) is preferably selected from the group consisting of materials (α) and (β) wherein:

(α) consists of polymer molecules each of which has at least one unit conforming to the immediately following general formula (II):

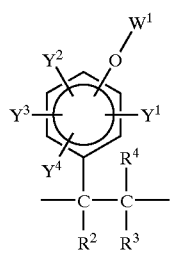

wherein:
each of $R^2$ through $R^4$ is selected, independently of each other and independently from one molecule of the component to another and from one to another unit conforming to this formula when there is more than one such unit in a single polymer molecule, from the group consisting of a hydrogen moiety, an alkyl moiety with from 1 to 5 carbon atoms, and an aryl moiety with from 6 to 18 carbon atoms;

each of $Y^1$ through $Y^4$ is selected, independently, except as noted further below, of each other and independently from one molecule of the component to another and from one to another unit conforming to this formula when there is more than one such unit in a single polymer molecule, from the group consisting of: a hydrogen atom moiety; a —$CH_2Cl$ moiety; an alkyl moiety with from 1 to 18 carbon atoms: an aryl moiety with from 6 to 18 carbon atoms; a moiety conforming to the general formula —$CR^{12}R^{13}OR^{14}$, where each of $R^{12}$ through $R^{14}$ is selected from the group consisting of a hydrogen moiety, an alkyl moiety, an aryl moiety, a hydroxyalkyl moiety, an aminoalkyl moiety, a mercaptoalkyl moiety, and a phosphoalkyl moiety; and a moiety Z that conforms to one of the two immediately following general formulas:

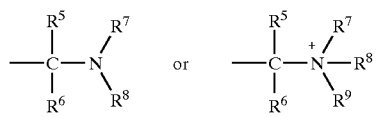

where each of $R^5$ through $R^8$ is selected, independently of each other and independently from one molecule of the component to another and from one to another unit of any polymer molecule conforming to this formula when there is more than one such unit in a single polymer molecule, from the group consisting of a hydrogen moiety, an alkyl moiety, an aryl moiety, a hydroxyalkyl moiety, an aminoalkyl moiety, a mercaptoalkyl moiety, and a phosphoalkyl moiety and $R^9$ is selected from the group consisting of a hydrogen moiety, an alkyl moiety, an aryl moiety, a hydroxy or polyhydroxy alkyl moiety, an amino or polyamino alkyl moiety, a mercapto or polymercapto alkyl moiety, a phospho or polyphospho alkyl moiety, an —$O^-$ moiety, and an —OH moiety, at least one of $Y^1$ through $Y^4$ in at least one unit of each selected polymer molecule being a moiety Z as above defined; and $W^1$ is selected, independently from one molecule of the component to another and from one to another unit of any polymer molecule conforming to this formula when there is more than one such unit in a single polymer molecule, from the group consisting of a hydrogen moiety, an acyl moiety, an acetyl moiety, a benzoyl moiety; a 3-allyloxy-2-hydroxypropyl moiety; a 3-benzyloxy-2-hydroxypropyl moiety; a 3-butoxy-2-hydroxypropyl moiety; a 3-alkyloxy-2-hydroxypropyl moiety; a 2-hydroxyoctyl moiety; a 2-hydroxyalkyl moiety; a 2-hydroxy-2-phenylethyl moiety; a 2-hydroxy-2-alkylphenylethyl moiety; a benzyl, methyl, ethyl, propyl, unsubstituted alkyl, unsubstituted allyl, or unsubstituted alkylbenzyl moiety; a halo or polyhalo alkyl, or halo or polyhalo alkenyl, moiety: a moiety derived from a condensation polymerization product of ethylene oxide, propylene oxide or a mixture thereof by deleting one hydrogen atom therefrom; and a sodium, potassium, lithium, ammonium or substituted ammonium, or phosphonium or substituted phosphonium cation moiety; and (β) consists of polymer molecules each of which does not include a unit conforming to general formula (II) as given above but does include at least one unit corresponding to the immediately following general formula (III):

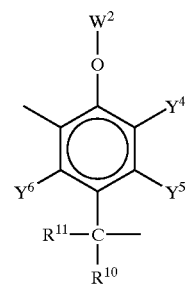

wherein:
each of $R^{10}$ and $R^{11}$ is selected, independently of each other and independently from one molecule of the component to another and from one to another unit conforming to this formula when there is more than one such unit in a single polymer molecule, from the group consisting of a hydrogen moiety, an alkyl moiety with from 1 to 5 carbon atoms, and an aryl moiety with from 6 to 18 carbon atoms;

each of $Y^4$ through $Y^6$ is selected, independently, except as noted further below, of each other and independently from one molecule of the component to another and from one to another unit of any polymer molecule conforming to this formula when there is more than one such unit in a single polymer molecule from the group consisting of: a hydrogen moiety; a —$CH_2Cl$ moiety; an alkyl moiety with from 1 to 18 carbon atoms; an aryl moiety with from 6 to 18 carbon atoms; a moiety conforming to the general formula —$CR^{12}R^{13}OR^{14}$, where each of $R^{12}$ through $R^{14}$ is selected from the group consisting of a hydrogen moiety, an alkyl moiety, an aryl moiety, a hydroxyalkyl moiety, an aminoalkyl moiety, a mercaptoalkyl moiety, and a phosphoalkyl moiety; and a moiety Z as defined for material (α) above, at least one of $Y^1$ through $Y^4$ in at least one unit of each selected polymer molecule being a moiety Z as above defined; and $W^2$ is selected, independently from one molecule of the component to another and from one to another unit conforming to this formula when there is more than one such unit in a single polymer molecule, from the group consisting of a hydrogen atom moiety, an acyl moiety, an acetyl moiety, a benzoyl moiety; a 3-allyloxy-2- hydroxypropyl moiety; a 3-benzyloxy-2-hydroxypropyl moiety; a 3-butoxy-2-hydroxypropyl moiety; a 3-alkyloxy-2-hydroxypropyl moiety; a 2-hydroxyethyl moiety; a 2-hydroxyalkyl moiety; a 2-hydroxyoctyl moiety; a 2-hydroxyalkyl moiety; a 2-hydroxy-2-phenylethyl moiety; a 2-hydroxy-2-alkylphenylethyl moiety; a benzyl, methyl, ethyl, propyl, unsubstituted alkyl, unsubstituted allyl, or unsubstituted alkylbenzyl moiety; a halo or polyhalo alkyl, or halo or polyhalo alkenyl, moiety; a moiety derived from a condensation polymerization product of ethylene oxide, propylene oxide or a mixture thereof by deleting one hydrogen atom therefrom; and a sodium, potassium, lithium, ammonium or substituted ammonium, or phosphonium or substituted phosphonium cation moiety;

the phrase "polymer molecule" in the above definitions of materials ($\alpha$) and ($\beta$) including any electrically neutral molecule with a molecular weight of at least 300 daltons.

It will be appreciated by those skilled in the art that general formulas (II) and (III) above represent repeating moieties that characterize the compound or materials of component (C) of a composition according to the present invention; no terminating end moieties are depicted. The end moieties of the molecules conforming to one of general formulas (II) or (III) can be selected by the skilled artisan relying upon art-disclosed techniques. For example, the end groups may result from a specific polymerization process employed or from intentional addition to alter the molecule's characteristics. Thus, the end groups may be hydrogen, hydroxyl, initiation fragments, chain transfer agents, disproportionation groups, or groups resulting from other methods of terminating a growing polymer chain. For economy at least, the end groups preferably are hydrogen or hydroxyl.

Ordinarily, primarily for reasons of economy, it is preferred to utilize as materials ($\alpha$) and/or ($\beta$) predominantly molecules which consist entirely, except for relatively short end groups, of units conforming to one of the general formulas (II) and (III) as described above. Again primarily for reasons of economy, such materials are generally prepared by reacting homopolymers of p-vinyl phenol, for material ($\alpha$), or phenol-aldehyde condensation products, for material ($\beta$), with formaldehyde and secondary amines to graft moieties Z on some of the activated benzene rings in the materials thus reacted.

However, in some particular instances, it may be more useful to utilize more chemically complex types of materials ($\alpha$) and/or ($\beta$). For example, molecules formed by reacting a condensable form of a molecule belonging to component ($\alpha$) or ($\beta$) as defined above, except that the molecule reacted need not initially satisfy the requirement for component ($\alpha$) or ($\beta$) that each molecule contain at least one moiety Z, with at least one other distinct type of molecule which is selected from the group consisting of phenols, tannins, novolak resins, lignin compounds, aldehydes, ketones, and mixtures thereof, in order to prepare a condensation reaction product, which optionally if needed is then further reacted with (1) an aldehyde or ketone and (2) a secondary amine to introduce at least one moiety Z as above defined to each molecule, so that the molecule can qualify as material ($\alpha$) or ($\beta$).

Another example of more complex materials that can be utilized as material ($\alpha$) is material in which the polymer chains are at least predominantly copolymers of simple or substituted 4-vinyl phenol with another vinyl monomer such as acrylonitrile, methacrylonitrile, methyl acrylate, methyl methacrylate, vinyl acetate, vinyl methyl ketone, isopropenyl methyl ketone, acrylic acid, methacrylic acid, acrylamide, methacrylamide, n-amyl methacrylate, styrene, m-bromostyrene, p-bromostyrene, pyridine, diallyidimethylammonium salts, 1,3-butadiene, n-butyl acrylate, t-butylamino-ethyl methacrylate, n-butyl methacrylate, t-butyl methacrylate, n-butyl vinyl ether, t-butyl vinyl ether, m-chlorostyrene, o-chlorostyrene, p-chlorostyrene, n-decyl methacrylate, N,N-diallylmelamine, N,N-di-n-butylacrylamide, di-n-butyl itaconate, di-n-butyl maleate, diethylaminoethyl methacrylate, diethylene glycol monovinyl ether, diethyl fumarate, diethyl itaconate, diethylvinyl phosphate, vinylphosphonic acid, diisobutyl maleate, diisopropyl itaconate, diisopropyl maleate, dimethyl fumarate, dimethyl itaconate, dimethyl maleate, di-n-nonyl fumarate, di-n-nonyl maleate, dioctyl fumarate, di-n-octyl itaconate, di-n-propyl itaconate, N-dodecyl vinyl ether, acidic ethyl fumarate, acidic ethyl maleate, ethyl acrylate, ethyl cinnamate, N-ethyl methacrylamide, ethyl methacrylate, ethyl vinyl ether, 5-ethyl-2-vinylpyridine, 5-ethyl-2-vinylpyridine-1-oxide, glycidyl acrylate, glycidyl methacrylate, n-hexyl methacrylate, 2-hydroxyethyl methacrylate, 2-hydroxypropyl methacrylate, isobutyl methacrylate, isobutyl vinyl ether, isoprene, isopropyl methacrylate, isopropyl vinyl ether, itaconic acid, lauryl methacrylate, methacrylamide, methacrylic acid, methacrylonitrile, N-methylolacrylamide, N-methylolmethacrylamide, N-isobutoxymethylacrylamide, N-isobutoxy-methylmethacrylamide, N-alkyloxymethylacrylamide, N-alkyl-oxymethylmethacrylamide, N-vinylcaprolactam, methyl acrylate, N-methylmethacrylamide, α-methylstyrene, m-methylstyrene, o-methylstyrene, p-methylstyrene, 2-methyl-5-vinylpyridine, n-propyl methacrylate, sodium p-styrenesulfonate, stearyl methacrylate, styrene, p-styrenesulfonic acid, p-styrenesulfonamide, vinyl bromide, 9-vinyl carbazole, vinyl chloride, vinylidene chloride, 1-vinyl naphthalene, 2-vinyl naphthalene, 2-vinylpyridine, 4-vinylpyridine, 2-vinylpyridine N-oxide, 4-vinyl pyrimidine, and N-vinylpyrrolidone.

The following preferences, primarily for reasons of economy, improved corrosion resistance, and/or increased water solubility, apply, independently for each preference, to the molecules of materials ($\alpha$) and ($\beta$):

each of $R^2$ through $R^6$, $R^{10}$, $R^{11}$, $W^1$, and $W^2$, independently for each and from one unit to another in the same or a different molecule, preferably is a hydrogen atom moiety;

each of $Y^1$ through $Y^6$, independently for each and from one unit to another in the same or a different molecule, preferably is a hydrogen atom moiety or a moiety Z;

averaged over the entire content of component (C), each polymer molecule contains a number of units corresponding to one of general formulas (II) and (III) as defined above that is at least, with increasing preference in the order given, 2, 3, 4, 5, 6, 7, or 8 and independently preferably is not more than 100, 75, 50, 40, 30, or 20;

in the total of materials ($\alpha$) and ($\beta$) in a composition used in step (II) according to the invention, the number of moieties Z has a ratio to the number of aromatic nuclei that is at least, with increasing preference in the order given, 0.01:1.0, 0.03:1.0, 0.05:1.0, 0.10:1.0, 0.20:1.0, 0.40:1.0, 0.50:1.0, 0.60:1.0, 0.70:1.0, 0.80:1.0, 0.90:1.0, or 0.95:1.0 and independently preferably is not more than, with increasing preference in the order given, 2.0:1.0, 1.6:1.0, 1.50:1.0, 1.40:1.0, 1.30:1.0, 1.20:1.0, 1.10:1.0, or 1.00:1.0;

in the total of materials ($\alpha$) and ($\beta$) in a composition used in step (II) according to the invention, the number of "polyhydroxy" moieties Z, in which at least $R^8$ in the general formulas given above for moieties Z has (i) from 3 to 8, or preferably from 4 to 6, carbon atoms and (ii) as many hydroxyl groups, each attached to a distinct one of the carbon atoms, as one less than the number of carbon atoms in the $R^8$ moiety, has a ratio to the total number of moieties Z in the composition that is at least, with increasing preference in the order given, 0.10:1.0, 0.20:1.0, 0.30:1.0, 0.40:1.0, 0.50:1.0, 0.60:1.0, 0.70:1.0, 0.80:1.0, 0.90:1.0, or 0.98:1.0 (preparation of such materials is described in the U.S. Patents cited above); and $R^7$ is an alkyl moiety having not more than, with increasing preference in the order given, 5, 4, 3, 2, or 1 carbon atom.

Furthermore, and independently of the other preferences, at least for reasons of economy, material of type ($\alpha$) is preferred over material of type ($\beta$).

Poly(5-vinyl-2-hydroxy-N-benzyl)-N-methylglucamine is a specific polymer of the most preferred type, which, in the acidic pH range which is preferred to be established, is believed to be present in an aqueous liquid composition according to this invention at least in part as an ammonium salt.

Irrespective of its exact chemical nature, component (C) is preferably present in an aqueous liquid composition according to this invention in a concentration that has a ratio to the stoichiometrically equivalent concentration as $H_3PO_4$ of component (A) in the same aqueous liquid composition that is at least, with increasing preference in the order given, 0.02:1.0, 0.04:1.0, 0.06:1.0, 0.08:1.0, 0.10:1.0, 0.12:1.0, 0.14:1.0, 0.16:1.0, 0.18:1.0, or 0.20:1.0 and independently preferably is not more than, with increasing preference in the order given, 2.0:1.0, 1.3:1.0, 1.0:1.0, 0.67:1.0, 0.53:1.0, 0.40:1.0, 0.35:1.0, 0.30:1.0, 0.26:1.0, 0.23:1.0, or 0.21:1.0.

Primarily for reasons of economy and/or convenience, component (D) as defined above is preferably selected from the large group of commercially available polymer latex dispersions in water and/or solutions in water with dispersed phases that meet the criteria specified above for component (D). For example, synthetic polymers of vinyl esters, styrene, and vinyl and vinylidene chlorides and natural, synthetically modified natural, or completely synthetic polysaccharide polymers are suitable, and polymers of acrylic and methacrylic acids and of esters, nitriles, and amides of those two unsaturated acids are preferred. Particularly preferred are polymers of the type known in the art as "self-crosslinking", which contain comonomers capable of chemical reaction during or after drying of the latex in which they are dispersed so as to form chemical crosslinks between the largely linear polymer backbone chains that were present in the dispersed phase of the latex. Further and independently of the other preferences, the constituents of component (D) preferably have a glass transition temperature that is at least, with increasing preference in the order given, −10, 0, +5, +10, +15, +20, +25, or +30° C. and independently preferably is not more than, with increasing preference in the order given, 75, 65, 55, 45, or 40° C.

Irrespective of its exact chemical nature, component (D), on a dried, non-volatile solids basis, preferably is present in an aqueous liquid composition according to this invention in a concentration that has a ratio to the stoichiometrically equivalent concentration as $H_3PO_4$ of component (A) in the same aqueous liquid composition that is at least, with increasing preference in the order given, 0.3:1.0, 0.5:1.0, 0.7:1.0, 0.9:1.0, 1.1:1.0, 1.3:1.0, 1.5:1.0, 1.7:1.0, 1.9:1.0, or 2.1:1.0 and independently preferably is not more than, with increasing preference in the order given, 15:1.0, 10:1.0, 8.0:1.0, 7.0:1.0, 6.0:1.0, 5.5:1.0, 5.0:1.0, 4.5:1.0, 4.0:1.0, 3.7:1.0, 3.4:1.0, 3.1:1.0, 2.9:1.0, 2.7:1.0, 2.5:1.0, or 2.3:1.0.

Optional component (E) is preferably present in a composition according to the to invention more often than any of the other optional components. Component (E) in preferred amounts reduces the coefficient of friction of a coating formed by treatment according to this invention. Addition of component (E) also appears to improve corrosion resistance in some but not all compositions otherwise according to the invention.

Although inorganic materials such as molybdenum disulfide and graphite are suitable for component (E) of an aqueous liquid composition according to this invention, primarily for reasons of economy and dispersion stability, component (E) is preferably selected from organic materials, particularly solid paraffins, synthetic polyethylene and/or polypropylene polymers (optionally partially or fully halogenated, especially fluorinated), and other natural or synthetic waxes, that have a specific gravity not more than, with increasing preference in the order given, 2.2, 2.0, 1.8, 1.6, 1.4, 1.2, or 1.0 and the requisite low coefficient of static friction to be part of component (E). Even more preferably, the materials for component (E) have a coefficient of static friction that is not more than, with increasing preference in the order given, 0.30, 0.28, 0.26, 0.24, 0.22, 0.20, 0.18, 0.16, 0.14, or 0.10. Such materials are available commercially in pre-dispersed form, and a material of this type that is stable in acidic aqueous solution is preferred; in order to achieve such stability, a cationic dispersing agent for the constituent of component (E) is generally preferred; nonionic dispersing agents are next most preferred, and anionic dispersing agents least preferred, because most dispersions prepared with them are unstable in acidic compositions according to this invention. Dispersions of high-density polyethylene, paraffin wax, or montan wax are especially preferred, with the former two generally less expensive than the latter and preferred for that reason. If minimization of friction is more important than cost in some particular use, however, perfluroethylene polymers are most preferred.

Irrespective of its exact chemical nature, if component (E) has the specific gravity of high density polyethylene, the concentration, on a non-volatile solids basis, of component (E) in an aqueous liquid composition according to the invention when component (E) is used preferably is such as to have a ratio to the concentration of component (D), on a dried, non-volatile solids basis, in the same aqueous liquid composition according to this invention that is at least, with increasing preference in the order given, 0.005:1.0, 0.015:1.0, 0.025:1.0, 0.035:1.0, 0.042:1.0, 0.046:1.0, 0.050:1.0, 0.052:1.0, 0.054:1.0, 0.056:1.0, or 0.058:1.0 and independently preferably is not more than, with increasing preference in the order given, 0.40:1.0, 0.25:1.0, 0.15:1.0, 0.10:1.0, 0.075:1.0, 0.068:1.0, 0.062:1.0, or 0.060:1.0. If the specific gravity of the component is different from that of high density polyethylene, the ratios given above should be adjusted so as to have the same (component (E) constituent volume) to (component (D) weight) ratio as do the above stated preferences for high density polyethylene.

Except for dispersing agent for component (E) and often also for component (D), the other optional components of an aqueous liquid composition according to the invention are not generally needed and therefore are preferably omitted. However, a surfactant may be needed to assure adequate wetting of some metal substrates and/or reduce foaming or may be advantageous to provide some cleaning along with the coating; a preservative may be needed if the composition is nourishing to micro-organisms in the environment where it is used; and a colorant may be useful in visually estimating the thickness of the coating applied or providing a decorative effect to the surface.

For a variety of reasons, it is sometimes preferred that compositions according to the invention as defined above should be substantially free from many ingredients used in compositions for similar purposes in the prior art. Specifically, when maximum storage stability of a concentrate, avoidance of possibly troublesome ions, and/or minimization of pollution potential is desired, it is preferred, with increasing preference in the order given, independently for each preferably minimized substance listed below, that these compositions contain no more than 25, 15, 9, 5, 3, 1.0, 0.35, 0.10, 0.08, 0.04, 0.02, 0.01, 0.001, or 0.0002, percent of each of the following constituents, except to the extent that these components may be part of a necessary or optional component of the composition as defined above: nitrite; halates and perhalates (i.e., perchlorate, chlorate, iodate, etc.); hydroxylamine and salts and complexes of hydroxylamine; chloride; bromide; iodide; organic compounds containing nitro groups; hexavalent chromium; ferricyanide; ferrocyanide; pyrazole compounds, and any dissolved ions of metals with an atomic number greater than 20. Components such as these may not be harmful in some instances, but they have not been found to be needed or advantageous in compositions according to this invention, and their minimization is therefore normally preferred at least for reasons of economy.

Treatment of a metal substrate in a process according to this invention preferably comprises forming a layer of an aqueous liquid working composition according to the invention as described above over the surface to be treated, and then drying into place, without any rinsing, or other disturbance, of the layer thus formed. For this reason, the concentrations of the necessary components (A) through (D) as described above in a working composition according to the invention are usually not at all critical. A thick layer of a working composition with low concentrations will contain the same ultimate constituents according to the invention as a thin layer of a more concentrated working composition. However, it has been found that at least a moderately acidic pH is needed for a working composition according to the invention, presumably, although the invention is not to be considered limited by this or any other theory, because some acidity is needed to dissolve at least some metal ions from the surface being treating to be incorporated into the coating. More particularly, the pH value of a working composition according to the invention preferably is at least, with increasing preference in the order given, −0.5, 0.0, 0.5, 1.0, 1.2, 1.4, 1.6, 1.8, or 2.0 and independently preferably is not more than, with increasing preference in the order given, 6.0, 5.0, 4.0, 3.8, 3.6, 3.4, 3.2, 3.0, 2.8, 2.6, 2.4, or 2.2.

The liquid layer of a working composition according to the invention formed in a process according to the invention preferably has a thickness such that the average increase in mass per unit area of metal substrate treated, measured after drying into place, is at least, with increasing preference in the order given, 0.20, 0.40, 0.60, 0.80, 1.0, 1.5, or 2.0 grams of mass increase per square meter of metal substrate surface treated, this unit being hereinafter usually abbreviated as "$g/m^2$" and independently, primarily for reasons of economy, preferably is not more than, with increasing preference in the order given, 10, 8, 6, 5.0, 4.0, 3.5, 3.0, 2.5, or 2.2 $g/m^2$. As a very general guideline, because of the practicalities of controlling liquid film coating thicknesses, the total content of components (A) through (E) of a working composition according to the invention preferably is at least, with increasing preference in the order given, 1, 3, 5, 7, 9, or 11% and independently preferably is not more than, with increasing preference in the order given, 50, 45, 40, 35, 30, 25, 20, or 15%.

Forming a liquid film on a metal substrate surface to be treated in a process according to the invention may be accomplished by any of numerous methods known to those skilled in the art, such as direct or transfer roll coating, curtain coating, immersion in and then removal from a volume of a working composition according to the invention held within a container, and spraying and then discontinuance of spraying, in all instances with the further option of removing some of the initially adherent liquid layer by use of a flow of compressed gas such as air or of a squeegee or other mechanical device, in order to dry into place a preferred amount of non-volatiles content of the aqueous liquid working composition. Drying can be accomplished by simple exposure to ambient air for a sufficient time, particularly if the treated surface has been formed at a sufficiently high temperature that drying occurs within a few seconds of separation from contact with the working aqueous liquid composition according to the invention as described above. Alternatively and usually preferably, one may hasten the drying by exposure of the wet surface after treatment to a higher temperature than the normal ambient temperature, in an oven or by any of the other means such as infrared radiant heating, microwave drying, and the like well known per se in the art. Preferably the peak metal temperature during this drying process does not exceed 150, 125, 100, 90, 80, 75, 70, or 66° C. The peak metal temperature may conveniently be controlled by a sensor strip attached to part of the substrate during drying. The sensor strip determines an upper limit on peak temperature by irreversible changes in temperature calibrated zones of the sensor strip. The peak temperature may also be measured directly during the drying process by other means known to those skilled in the art, e.g., an infrared photometer.

Preferably, the temperature of the working aqueous liquid composition during a process according to the invention is at least, with increasing preference in the order given, 15, 17, 19, 21, 23, or 25° C. and independently preferably, primarily for reasons of economy, is not more than 60, 50, 45, 40, 35, or 30° C. The quality of the coating layer formed is not known to be substantially affected by the temperature during treatment if the temperature is within any of these preferred limits The time during which physical contact is maintained between the metal surface to be treated and a working aqueous liquid composition according to the invention preferably, for reasons of economy of operation, is as short as possible, consistent with formation of a coating layer as effective as desired. More specifically, the time of contact preferably is not more than, with increasing preference in the order given, 200, 150, 100, 75, 50, 40, 30, 25, 20, 15, 13, 11, 10, 9.0, 8.0, 7.0, 6.0, 5.0, 4.0, 3.0, 2.0, 1.5, or 1.0 seconds.

Before treatment according to this invention is to be used for any metal substrate, the substrate is preferably thoroughly cleaned by any of various methods well known to those skilled in the art to be suitable for the particular substrate to be treated.

As with many other types of metal surface treatment compositions, with those according to this invention it is economically advantageous to supply their active ingredients to ultimate users in one or more liquids that contain much higher concentrations of the active ingredients than are normally used in working compositions. In this particular instance, it has been found that the most concentrated make-up concentrates that can practically be prepared do not consistently have the degree of storage stability desired if they contain all of components (A) through (E) of preferred compositions according to the invention as described above. However, components (A) through (C) may be present in a primary make-up concentrate with good storage stability. Such a concentrate preferably contains, independently for each component given: an amount of component (A) that corresponds stoichiometrically to an amount of $H_3PO_4$ that constitutes at least, with increasing preference in the order given, 20, 24, 28, 31, or 34% of the total primary make-up concentrate; at least, with increasing preference in the order given, 0.50, 0.60, 0.70, 0.80, 0.90, 0.95, 1.00, or 1.05 moles of one or more metal atoms or boron atoms associated with fluorine atoms in an anion per kilogram of the total primary make-up concentrate; and at least, with increasing preference in the order given, 4.0, 4.5, 5.0, 5.5, 6.0, 6.5, or 7.0 percent of component (C). In addition, the preferences that are given above for ratios between components (B) and (A) and between component (C) and component (A) in working compositions also apply to these primary make-up concentrates, because they preferably contain all of components (A) through (C) that are contained in the working compositions in which these primary make-up concentrates are used as ingredients.

A working composition for use according to the invention preferably is prepared from a preferred primary make-up concentrate as described above by first diluting a concentrated source, usually a commercially supplied latex, of the intended amount of component (D) in the working composition with deionized water to about half of the intended final volume of the working composition. Next, with stirring or other agitation, add the proper amount of preferred primary make-up concentrate to introduce the intended amounts of components (A) through (C) to the working composition. Continue mixing until the appearance of the mixture is uniform. Then add from a concentrated source the amount of component (E) intended for the final working composition and any additional volume of deionized water needed to complete the intended working composition mass or volume, and mix the ingredients together for at least 15 minutes after the last addition, utilizing a mixing method that minimizes foam generation.

The practice of this invention may be further appreciated by consideration of the following, non-limiting examples, and the benefits of the invention may be appreciated by contrast with the comparison examples set forth below and additional comparisons known to those skilled in the art.

Working Compositions and Processes—Group 1

These compositions are shown in Table 1 below. Each composition was coated on duplicate hot-dipped-galvanized flat test panels at normal ambient human comfort temperature (i.e., 18–23° C.), using a drawbar to put into place an aqueous liquid composition with a substantially uniform thickness, which was then dried into place in a convection oven maintained at about 120° C., but was kept in this oven for a short enough time that the peak metal temperature did not exceed 66° C. After completion of this treatment, the coated panels were subjected to bare salt-spray testing according to American Society for Testing and Materials Procedure B117-90. Coating add-on masses per unit area and the salt spray test results are shown in Table 2, in which results for duplicate panels under the same preparation and testing conditions are shown in side-by-side columns.

TABLE 1

| Composition Number | Parts by Mass in Working composition of: | | | | | | | | |
|---|---|---|---|---|---|---|---|---|---|
| | Deionized Water | 75% $H_3PO_4$ | Component (B) | | Component (C) | Component (D) | Component (E) | | |
| | | | 60% $H_2TiF_6$ | 20% $H_2ZrF_6$ | | | ChemCor KSL30N | Aquaslip 671 | ChemCor 392C30 |
| 1.1.0 | 7.05 | 0.10 | 0.10 | | 0.25 | 2.5 | | | |
| 1.1.1 | 7.05 | 0.10 | 0.10 | | 0.25 | 2.5 | 0.50 | | |
| 1.1.2 | 7.05 | 0.10 | 0.10 | | 0.25 | 2.5 | | 0.38 | |
| 1.1.3 | 7.05 | 0.10 | 0.10 | | 0.25 | 2.5 | | | 0.50 |
| 1.2.0 | 6.85 | 0.10 | 0.30 | | 0.25 | 2.5 | | | |
| 1.2.1 | 6.85 | 0.10 | 0.30 | | 0.25 | 2.5 | 0.50 | | |
| 1.2.2 | 6.85 | 0.10 | 0.30 | | 0.25 | 2.5 | | 0.38 | |
| 1.2.3 | 6.85 | 0.10 | 0.30 | | 0.25 | 2.5 | | | 0.50 |
| 1.3.0 | 6.65 | 0.50 | 0.10 | | 0.25 | 2.5 | | | |
| 1.3.1 | 6.65 | 0.50 | 0.10 | | 0.25 | 2.5 | 0.50 | | |
| 1.3.2 | 6.65 | 0.50 | 0.10 | | 0.25 | 2.5 | | 0.38 | |
| 1.3.3 | 6.65 | 0.50 | 0.10 | | 0.25 | 2.5 | | | 0.050 |
| 1.4.0 | 6.45 | 0.50 | 0.30 | | 0.25 | 2.5 | | | |
| 1.4.1 | 6.45 | 0.50 | 0.30 | | 0.25 | 2.5 | 0.50 | | |
| 1.4.2 | 6.45 | 0.50 | 0.30 | | 0.25 | 2.5 | | 0.38 | |
| 1.4.3 | 6.45 | 0.50 | 0.30 | | 0.25 | 2.5 | | | 0.50 |
| 1.5.0 | 6.80 | 0.10 | 0.10 | | 0.50 | 2.5 | | | |
| 1.5.1 | 6.80 | 0.10 | 0.10 | | 0.50 | 2.5 | 0.50 | | |
| 1.5.2 | 6.80 | 0.10 | 0.10 | | 0.50 | 2.5 | | 0.38 | |
| 1.5.3 | 6.80 | 0.10 | 0.10 | | 0.50 | 2.5 | | | 0.50 |
| 1.6.0 | 6.60 | 0.10 | 0.30 | | 0.50 | 2.5 | | | |
| 1.6.1 | 6.60 | 0.10 | 0.30 | | 0.50 | 2.5 | 0.50 | | |
| 1.6.2 | 6.60 | 0.10 | 0.30 | | 0.50 | 2.5 | | 0.38 | |
| 1.6.3 | 6.60 | 0.10 | 0.30 | | 0.50 | 2.5 | | | 0.50 |
| 1.7.0 | 6.40 | 0.50 | 0.10 | | 0.50 | 2.5 | | | |
| 1.7.1 | 6.40 | 0.50 | 0.10 | | 0.50 | 2.5 | 0.50 | | |
| 1.7.2 | 6.40 | 0.50 | 0.10 | | 0.50 | 2.5 | | 0.38 | |
| 1.7.3 | 6.40 | 0.50 | 0.10 | | 0.50 | 2.5 | | | 0.50 |
| 1.8.0 | 6.20 | 0.50 | 0.30 | | 0.50 | 2.5 | | | |
| 1.8.1 | 6.20 | 0.50 | 0.30 | | 0.50 | 2.5 | 0.50 | | |

TABLE 1-continued

| | Parts by Mass in Working composition of: | | | | | | | |
|---|---|---|---|---|---|---|---|---|
| | | | Component (B) | | Com- | Com- | Component (E) | | |
| Composition Number | Deionized Water | 75% H$_3$PO$_4$ | 60% H$_2$TiF$_6$ | 20% H$_2$ZrF$_6$ | ponent (C) | ponent (D) | ChemCor KSL30N | Aquaslip 671 | ChemCor 392C30 |
| 1.8.2 | 6.20 | 0.50 | 0.30 | | 0.50 | 2.5 | | 0.38 | |
| 1.8.3 | 6.20 | 0.50 | 0.30 | | 0.50 | 2.5 | | | 0.50 |
| 1.9.0 | 6.30 | 0.10 | 0.10 | | 1.00 | 2.5 | | | |
| 1.9.1 | 6.30 | 0.10 | 0.10 | | 1.00 | 2.5 | 0.50 | | |
| 1.9.2 | 6.30 | 0.10 | 0.10 | | 1.00 | 2.5 | | 0.38 | |
| 1.9.3 | 6.30 | 0.10 | 0.10 | | 1.00 | 2.5 | | | 0.50 |
| 1.10.0 | 6.10 | 0.10 | 0.30 | | 1.00 | 2.5 | | | |
| 1.10.1 | 6.10 | 0.10 | 0.30 | | 1.00 | 2.5 | 0.50 | | |
| 1.10.2 | 6.10 | 0.10 | 0.30 | | 1.00 | 2.5 | | 0.38 | |
| 1.10.3 | 6.10 | 0.10 | 0.30 | | 1.00 | 2.5 | | | 0.50 |
| 1.11.0 | 5.90 | 0.50 | 0.10 | | 1.00 | 2.5 | | | |
| 1.11.1 | 5.90 | 0.50 | 0.10 | | 1.00 | 2.5 | 0.50 | | |
| 1.11.2 | 5.90 | 0.50 | 0.10 | | 1.00 | 2.5 | | 0.38 | |
| 1.11.3 | 5.90 | 0.50 | 0.10 | | 1.00 | 2.5 | | | 0.50 |
| 1.12.0 | 5.70 | 0.50 | 0.30 | | 1.00 | 2.5 | | | |
| 1.12.1 | 5.70 | 0.50 | 0.30 | | 1.00 | 2.5 | 0.50 | | |
| 1.12.2 | 5.70 | 0.50 | 0.30 | | 1.00 | 2.5 | | 0.38 | |
| 1.12.3 | 5.70 | 0.50 | 0.30 | | 1.00 | 2.5 | | | 0.50 |
| 1.13.0 | 6.65 | 0.10 | | 0.50 | 0.25 | 2.5 | | | |
| 1.13.1 | 6.65 | 0.10 | | 0.50 | 0.25 | 2.5 | 0.50 | | |
| 1.13.2 | 6.65 | 0.10 | | 0.50 | 0.25 | 2.5 | | 0.38 | |
| 1.13.3 | 6.65 | 0.10 | | 0.50 | 0.25 | 2.5 | | | 0.50 |
| 1.14.0 | 6.15 | 0.10 | | 1.00 | 0.25 | 2.5 | | | |
| 1.14.1 | 6.15 | 0.10 | | 1.00 | 0.25 | 2.5 | 0.50 | | |
| 1.14.2 | 6.15 | 0.10 | | 1.00 | 0.25 | 2.5 | | 0.38 | |
| 1.14.3 | 6.15 | 0.10 | | 1.00 | 0.25 | 2.5 | | | 0.50 |
| 1.15.0 | 6.25 | 0.50 | | 0.50 | 0.25 | 2.5 | | | |
| 1.15.1 | 6.25 | 0.50 | | 0.50 | 0.25 | 2.5 | 0.50 | | |
| 1.15.2 | 6.25 | 0.50 | | 0.50 | 0.25 | 2.5 | | 0.38 | |
| 1.15.3 | 6.25 | 0.50 | | 0.50 | 0.25 | 2.5 | | | 0.50 |
| 1.16.0 | 5.75 | 0.50 | | 1.00 | 0.25 | 2.5 | | | |
| 1.16.1 | 5.75 | 0.50 | | 1.00 | 0.25 | 2.5 | 0.50 | | |
| 1.16.2 | 5.75 | 0.50 | | 1.00 | 0.25 | 2.5 | | 0.38 | |
| 1.16.3 | 5.75 | 0.50 | | 1.00 | 0.25 | 2.5 | | | 0.50 |
| 1.17.0 | 6.40 | 0.10 | | 0.50 | 0.50 | 2.5 | | | |
| 1.17.1 | 6.40 | 0.10 | | 0.50 | 0.50 | 2.5 | 0.50 | | |
| 1.17.2 | 6.40 | 0.10 | | 0.50 | 0.50 | 2.5 | | 0.38 | |
| 1.17.3 | 6.40 | 0.10 | | 0.50 | 0.50 | 2.5 | | | 0.50 |
| 1.18.0 | 5.90 | 0.10 | | 1.00 | 0.50 | 2.5 | | | |
| 1.18.1 | 5.90 | 0.10 | | 1.00 | 0.50 | 2.5 | 0.50 | | |
| 1.18.2 | 5.90 | 0.10 | | 1.00 | 0.50 | 2.5 | | 0.38 | |
| 1.18.3 | 5.90 | 0.10 | | 1.00 | 0.50 | 2.5 | | | 0.50 |
| 1.19.0 | 6.00 | 0.50 | | 0.50 | 0.50 | 2.5 | | | |
| 1.19.1 | 6.00 | 0.50 | | 0.50 | 0.50 | 2.5 | 0.50 | | |
| 1.19.2 | 6.00 | 0.50 | | 0.50 | 0.50 | 2.5 | | 0.38 | |
| 1.19.3 | 6.00 | 0.50 | | 0.50 | 0.50 | 2.5 | | | 0.50 |
| 1.20.0 | 5.50 | 0.50 | | 1.00 | 0.50 | 2.5 | | | |
| 1.20.1 | 5.50 | 0.50 | | 1.00 | 0.50 | 2.5 | 0.50 | | |
| 1.20.2 | 5.50 | 0.50 | | 1.00 | 0.50 | 2.5 | | 0.38 | |
| 1.20.3 | 5.50 | 0.50 | | 1.00 | 0.50 | 2.5 | | | 0.50 |
| 1.21.0 | 5.90 | 0.10 | | 0.50 | 1.00 | 2.5 | | | |
| 1.21.1 | 5.90 | 0.10 | | 0.50 | 1.00 | 2.5 | 0.50 | | |
| 1.21.2 | 5.90 | 0.10 | | 0.50 | 1.00 | 2.5 | | 0.38 | |
| 1.21.3 | 5.90 | 0.10 | | 0.50 | 1.00 | 2.5 | | | 0.50 |
| 1.22.0 | 5.40 | 0.10 | | 0.50 | 1.00 | 2.5 | | | |
| 1.22.1 | 5.40 | 0.10 | | 0.50 | 1.00 | 2.5 | 0.50 | | |
| 1.22.2 | 5.40 | 0.10 | | 0.50 | 1.00 | 2.5 | | 0.38 | |
| 1.22.3 | 5.40 | 0.10 | | 0.50 | 1.00 | 2.5 | | | 0.50 |
| 1.23.0 | 5.50 | 0.50 | | 0.50 | 1.00 | 2.5 | | | |
| 1.23.1 | 5.50 | 0.50 | | 0.50 | 1.00 | 2.5 | 0.50 | | |
| 1.23.2 | 5.50 | 0.50 | | 0.50 | 1.00 | 2.5 | | 0.38 | |
| 1.23.3 | 5.50 | 0.50 | | 0.50 | 1.00 | 2.5 | | | 0.50 |
| 1.24.0 | 5.00 | 0.50 | | 1.00 | 1.00 | 2.5 | | | |
| 1.24.1 | 5.00 | 0.50 | | 1.00 | 1.00 | 2.5 | 0.50 | | |

TABLE 1-continued

| | Parts by Mass in Working composition of: | | | | | | | | |
|---|---|---|---|---|---|---|---|---|---|
| | Deion- | | Component (B) | | Com- | Com- | Component (E) | | |
| Composition Number | ized Water | 75% $H_3PO_4$ | 60% $H_2TiF_6$ | 20% $H_2ZrF_6$ | ponent (C) | ponent (D) | ChemCor KSL30N | Aquaslip 671 | ChemCor 392C30 |
| 1.24.2 | 5.00 | 0.50 | | 1.00 | 1.00 | 2.5 | | 0.38 | |
| 1.24.3 | 5.00 | 0.50 | | 1.00 | 1.00 | 2.5 | | | 0.50 |

Notes for Table 1
In a column heading in which a percentage value for an active ingredient appears, the remainder of the mass for that ingredient was water. A blank table cell in a column indicates that none of the ingredient specified at the top of that column was added to the working composition specified in the row.
Component (C) for this Table was a 30% non-volatiles by weight solution/dispersion in water of a polymer made substantially as taught in lines 47–59 of column 11 of U.S. Pat. No. 5,068,299 or of a polymer made substantially as taught in lines 1–18 of column 10 of U.S. Pat. No. 5,116,912. The actual preparation of the polymers may alternatively be practiced as taught in a U.S. application of David R. McCormick, Andreas Lindert, and John R. Pierce filed on October 1, 1997 and titled AQUEOUS COMPOSITIONS CONTAINING POLYPHENOL COPOLYMERS AND PROCESSES FOR THEIR PREPARATION, the entire disclosure of which, except for any part that may be inconsistent with any explicit statement herein, is hereby incorporated herein by reference.
Component (D) for this Table was one of the following commercially supplied latexes: Accumer ™ 1510 latex from Zeneca, Inc., reported by its supplier to be a 40% solids solution in water of a polyacrylic acid; Neocryl ™ A 640 latex from Zeneca, Inc., reported by its supplier to be a 40% solids dispersion/solution in water of a styrene-acrylic copolymer; or Rhoplex ™ HA-16 or HA-12 latexes from Rohm & Haas Co, reported by their supplier to be 41–46% solids dispersions of self-crosslinking acrylic acid copolymers.
ChemCor KSL30N and 392C30 dispersions were obtained from ChemCor, Chester, New York and were reported by their supplier to be 29–31% solids dispersions in water of montan ester wax, with a nonionic dispersing agent, and high density polyethylene, with a cationic dispersing agent, respectively.
Aquaslip ™ 671 dispersion was obtained from Lubrizol (U.S. distributor for Langer & Co. GmbH, Ritterhude, Germany) and was reported by its manufacturer to be a 40% non-volatiles dispersion in water of polyethylene wax in water, with a pH value of 3.5–4.5 and a fine particle size.

TABLE 2

| Composition Number | Coating Add-On Mass, g/m² | Salt Spray Test Rating After: 24 Hours | 96 Hours | Composition Number | Coating Add-On Mass, g/m² | Salt Spray Test Rating After: 24 Hours | 96 Hours |
|---|---|---|---|---|---|---|---|
| 1.1.0 | 2.5 | <1 | 2 | 1.1.0 | 2.5 | 2 | 10 |
| 1.1.1 | 2.7 | 2 | 30 | 1.1.1 | 2.7 | 1 | 2 |
| 1.1.2 | 2.3 | 2 | 10 | 1.1.2 | 2.3 | 1 | 5 |
| 1.1.3 | 1.9 | 5 | 15 | 1.1.3 | 1.9 | 20 | 75 |
| 1.2.0 | 2.2 | 2 | 5 | 1.2.0 | 2.2 | 1 | 10 |
| 1.2.1 | 2.5 | 2 | 20 | 1.2.1 | 2.5 | 5 | 15 |
| 1.2.2 | 2.4 | 1 | 25 | 1.2.2 | 2.4 | 5 | 25 |
| 1.2.3 | 1.9 | <1 | 10 | 1.2.3 | 1.9 | 10 | 40 |
| 1.3.0 | 1.9 | 3 | 15 | 1.3.0 | 1.9 | 1 | 10 |
| 1.3.1 | 2.4 | N | 2 | 1.3.1 | 2.4 | N | 5 |
| 1.3.2 | 2.6 | 5 | 50 | 1.3.2 | 2.6 | 5 | 40 |
| 1.3.3 | 2.7 | 10 | 90 | 1.3.3 | 2.7 | 40 | 95 |
| 1.4.0 | 2.1 | N | <1 | 1.4.0 | 2.1 | N | N |
| 1.4.1 | 2.1 | N | N | 1.4.1 | 2.1 | N | <1 |
| 1.4.2 | 2.6 | N | 1 | 1.4.2 | 2.6 | N | 1 |
| 1.4.3 | 2.3 | <1 | 5 | 1.4.3 | 2.3 | 2 | 10 |
| 1.5.0 | 2.3 | 1 | 20 | 1.5.0 | 2.3 | <1 | 10 |
| 1.5.1 | 2.5 | <1 | 15 | 1.5.1 | 2.5 | N | 5 |
| 1.5.2 | 2.5 | 1 | 10 | 1.5.2 | 2.5 | 10 | 15 |
| 1.5.3 | 2.1 | 95 | 99 | 1.5.3 | 2.1 | 95 | 99 |
| 1.6.0 | 1.8 | 1 | 15 | 1.6.0 | 1.8 | <1 | 2 |
| 1.6.1 | 2.5 | N | 5 | 1.6.1 | 2.5 | 1 | 15 |
| 1.6.2 | 2.4 | <1 | 10 | 1.6.2 | 2.4 | <1 | 10 |
| 1.6.3 | 2.4 | 75 | 75 | 1.6.3 | 2.4 | 80 | 90 |
| 1.7.0 | 2.4 | 20 | 25 | 1.7.0 | 2.4 | 5 | 10 |
| 1.7.1 | 2.4 | 1 | 5 | 1.7.1 | 2.4 | 2 | 20 |
| 1.7.2 | 2.9 | <1 | 10 | 1.7.2 | 2.9 | 10 | 40 |
| 1.7.3 | 2.2 | 95 | 99 | 1.7.3 | 2.2 | 75 | 99 |
| 1.8.0 | 2.5 | N | 1 | 1.8.0 | 2.5 | N | N |
| 1.8.1 | 2.4 | N | N | 1.8.1 | 2.4 | N | N |
| 1.8.2 | 3.1 | N | N | 1.8.2 | 3.1 | N | 1 |
| 1.8.3 | 2.3 | 1 | 5 | 1.8.3 | 2.3 | 1 | 10 |
| 1.9.0 | 2.2 | 10 | 50 | 1.9.0 | 2.2 | 20 | 60 |
| 1.9.1 | 2.7 | 2 | 15 | 1.9.1 | 2.7 | 10 | 25 |
| 1.9.2 | 2.6 | 5 | 15 | 1.9.2 | 2.6 | 10 | 60 |
| 1.9.3 | 2.5 | 99 | 99 | 1.9.3 | 2.5 | 99 | 99 |

TABLE 2-continued

| Composition Number | Coating Add-On Mass, g/m² | Salt Spray Test Rating After: | | Composition Number | Coating Add-On Mass, g/m² | Salt Spray Test Rating After: | |
|---|---|---|---|---|---|---|---|
| | | 24 Hours | 96 Hours | | | 24 Hours | 96 Hours |
| 1.10.0 | 2.4 | 1 | 10 | 1.10.0 | 2.4 | 10 | 15 |
| 1.10.1 | 2.9 | <1 | 15 | 1.10.1 | 2.9 | 5 | 20 |
| 1.10.2 | 2.6 | 10 | 15 | 1.10.2 | 2.6 | 5 | 20 |
| 1.10.3 | 2 | 95 | 95 | 1.10.3 | 2.0 | 95 | 99 |
| 1.11.0 | 2.2 | 90 | 90 | 1.11.0 | 2.2 | 90 | 90 |
| 1.11.1 | 2.4 | 5 | 25 | 1.11.1 | 2.4 | 75 | 99 |
| 1.11.2 | 2.6 | 10 | 15 | 1.11.2 | 2.6 | 75 | 80 |
| 1.11.3 | 2.4 | 80 | 99 | 1.11.3 | 2.4 | 60 | 99 |
| 1.12.0 | 2.7 | <1 | <1 | 1.12.0 | 2.7 | 5 | 5 |
| 1.12.1 | 2.7 | N | 1 | 1.12.1 | 2.7 | <1 | 1 |
| 1.12.2 | 3.3 | N | 1 | 1.12.2 | 3.3 | 1 | 1 |
| 1.12.3 | 2.1 | 2 | 30 | 1.12.3 | 2.1 | N | 10 |
| 1.13.0 | 3.4 | 10 | 40 | 1.13.0 | 3.4 | 5 | 40 |
| 1.13.1 | 2.3 | <1 | 5 | 1.13.1 | 2.3 | 1 | 5 |
| 1.13.2 | 2.6 | 25 | 45 | 1.13.2 | 2.6 | 30 | 50 |
| 1.13.3 | 2.1 | 95 | 99 | 1.13.3 | 2.1 | 99 | 99 |
| 1.14.0 | 1.9 | 50 | 90 | 1.14.0 | 1.9 | 40 | 95 |
| 1.14.1 | 2.5 | 15 | 60 | 1.14.1 | 2.5 | 50 | 75 |
| 1.14.2 | 2.1 | 25 | 70 | 1.14.2 | 2.1 | 30 | 70 |
| 1.14.3 | 2.4 | 95 | 95 | 1.14.3 | 2.4 | 95 | 95 |
| 1.15.0 | 2.4 | 60 | 95 | 1.15.0 | 2.4 | 90 | 99 |
| 1.15.1 | 2.6 | 25 | 80 | 1.15.1 | 2.6 | 50 | 90 |
| 1.15.2 | 2.7 | 25 | 60 | 1.15.2 | 2.7 | 60 | 90 |
| 1.15.3 | 2.2 | 99 | 99 | 1.15.3 | 2.2 | 90 | 99 |
| 1.16.0 | 2.5 | 10 | 20 | 1.16.0 | 2.5 | 10 | 40 |
| 1.16.1 | 2.5 | 1 | 5 | 1.16.1 | 2.5 | 40 | 99 |
| 1.16.2 | 2.5 | 30 | 40 | 1.16.2 | 2.5 | 40 | 99 |
| 1.16.3 | 1.9 | 99 | 99 | 1.16.3 | 1.9 | 99 | 99 |
| 1.17.0 | 2.2 | 5 | 20 | 1.17.0 | 2.2 | 2 | 20 |
| 1.17.1 | 2.6 | 2 | 2 | 1.17.1 | 2.6 | <1 | 10 |
| 1.17.2 | 2.5 | 10 | 30 | 1.17.2 | 2.5 | 20 | 30 |
| 1.17.3 | 2.4 | 99 | 99 | 1.17.3 | 2.4 | 99 | 99 |
| 1.18.0 | 2.6 | 40 | 80 | 1.18.0 | 2.6 | 60 | 90 |
| 1.18.1 | 2.7 | 2 | 5 | 1.18.1 | 2.7 | 2 | 30 |
| 1.18.2 | 2.4 | 10 | 30 | 1.18.2 | 2.4 | 20 | 40 |
| 1.18.3 | 2.1 | 99 | 99 | 1.18.3 | 2.1 | 99 | 99 |
| 1.19.0 | 2.6 | 20 | 70 | 1.19.0 | 2.6 | 80 | 90 |
| 1.19.1 | 2.7 | 2 | 20 | 1.19.1 | 2.7 | 10 | 80 |
| 1.19.2 | 3.0 | 20 | 70 | 1.19.2 | 3.0 | 30 | 70 |
| 1.19.3 | 2.1 | 95 | 99 | 1.19.3 | 2.1 | 40 | 99 |
| 1.20.0 | 2.5 | 50 | 80 | 1.20.0 | 2.5 | 90 | 90 |
| 1.20.1 | 2.5 | 1 | 5 | 1.20.1 | 2.5 | <1 | 5 |
| 1.20.2 | 2.5 | 20 | 40 | 1.20.2 | 2.5 | 20 | 80 |
| 1.20.3 | 2.2 | 95 | 99 | 1.20.3 | 2.2 | 99 | 99 |
| 1.21.0 | 2.4 | 50 | 90 | 1.21.0 | 2.4 | 60 | 80 |
| 1.21.1 | 2.5 | 5 | 15 | 1.21.1 | 2.5 | 1 | 10 |
| 1.21.2 | 2.5 | 10 | 30 | 1.21.2 | 2.5 | 15 | 60 |
| 1.21.3 | 2.3 | 99 | 99 | 1.21.3 | 2.3 | 95 | 99 |
| 1.22.0 | 2.9 | 20 | 80 | 1.22.0 | 2.9 | 50 | 90 |
| 1.22.1 | 2.2 | 10 | 20 | 1.22.1 | 2.3 | 2 | 10 |
| 1.22.2 | 2.3 | 40 | 95 | 1.22.2 | 2.3 | 20 | 80 |
| 1.22.3 | 2.4 | 95 | 95 | 1.22.3 | 2.4 | 95 | 99 |
| 1.23.0 | 2.3 | 15 | 90 | 1.23.0 | 2.3 | 30 | 70 |
| 1.23.1 | 2.6 | 5 | 15 | 1.23.1 | 2.6 | 2 | 20 |
| 1.23.2 | 2.3 | 40 | 95 | 1.23.2 | 2.3 | 50 | 90 |
| 1.23.3 | 2.1 | 95 | 95 | 1.23.3 | 2.1 | 85 | 99 |
| 1.24.0 | 2.3 | 2 | 10 | 1.24.0 | 2.3 | 5 | 20 |
| 1.24.1 | 2.5 | 1 | 5 | 1.24.1 | 2.5 | N | 5 |
| 1.24.2 | 2.8 | 2 | 15 | 1.24.2 | 2.8 | 5 | 15 |
| 1.24.3 | 2.1 | 40 | 95 | 1.24.3 | 2.1 | 70 | 99 |

Notes for Table 2
The numbers for the salt spray results are percentages of the surface visibly covered by white rust after the time of testing specified, and unless there is a specification to the contrary, indicates that no red rust was visible. "N" means no white or red rust was visible.

Example and Comparison Example Group 2

This group includes comparisons against prior art commercial products. The substrates were flat panels of Pittsburgh-Canfield "Polished" electrogalvanized steel. Before treatment with a composition according to the invention or a comparison composition, the panels were cleaned according to a PARCO® Cleaner 338 process commercially available from the Henkel Surface Technologies Div. of Henkel Corp., Madison Heights, Mich. (hereinafter usually abbreviated as "HST"), using 5 points concentration of the cleaner concentrate for 7–10 seconds of spraying on the panels at 49° C., subsequent rinsing in hot water, and drying in air. The tested aqueous liquid compositions according to the invention are shown in Table 3. The ingredients identified by component letter only have the same meaning as in Table 1. ChemCor 191C30 was commercially obtained from ChemCor and was reported by its supplier to be a 29–31% emulsion in water of high density linear crystalline polyethylene stabilized with a cationic dispersing agent.

TABLE 3

| | Parts by Mass in Composition of: | | | | | | |
|---|---|---|---|---|---|---|---|
| Composition Number | Deionized Water | 75% $H_3PO_4$ | 60% $H_2TiF_6$ | Component (C) | Component (D) | Component (E) ChemCor KSL30 | Component (E) ChemCor 191C30 |
| 2.0 | 129 | 10 | 6.0 | 5.0 | 6.0 | | |
| 2.1 | 129 | 10 | 6.0 | 5.0 | 6.0 | 10 | |
| 2.2 | 129 | 10 | 6.0 | 5.0 | 6.0 | | 10 |

Substrates cleaned as described above were coated with these compositions and with NOVABRIGHT® C 1005, an HST commercial product for passivating galvanized steel surfaces, in the same manner as for Group 1, then these panels and others obtained from commercial plant scale coating processes were tested in salt spray in the same manner as for Group 1. Measured coating add-on masses per unit area, peak metal temperatures during drying as part of treatment according to this invention or with a comparison product, and salt spray test results are shown in Table 4. Replicate panels were used, and the intended replicates are shown one under the other in Table 4, with entries in the two leftmost columns of this table also applying to blank cells between themselves and the next entry in the same column.

TABLE 4

| Composition Identification | Peak Metal Temperature, ° C. | Coating Add-On Mass, g/m² | Salt Spray Test Result After: | | | |
|---|---|---|---|---|---|---|
| | | | 24 Hours | 48 Hours | 72 Hours | 96 Hours |
| 2.0 | 66 | 2.6 | 25 | 25 | 25 | 25 |
| | | 2.6 | 50 | 60 | 60 | 60 |
| | | 1.0 | 2 | 2 | 10 | 15 |
| | | 1.6 | N | >1 | 2 | 2 |
| 2.1 | 66 | 2.7 | 10 | 10 | 10 | 10 |
| | | 2.1 | 1 | 2 | 5 | 10 |
| | | 1.3 | 1 | 2 | 5 | 10 |
| | | 1.4 | N | >1 | 1 | 2 |
| 2.2 | 66 | 2.5 | 2 | 5 | 5 | 10 |
| | | 2.3 | 2 | 5 | 5 | 5 |
| | | 1.4 | 1 | 5 | 15 | 20 |
| | | 1.0 | N | 2 | 5 | 10 |
| | 121 | 2.0 | 1 | 5 | 5 | 10 |
| | | 2.4 | 5 | 5 | 5 | 5 |
| | | 1.0 | N | 5 | 5 | 15 |
| | | 1.2 | 1 | 2 | 5 | 10 |
| NBG | 66 | 2.3 | 10 | 95* | 100* | 100* |
| | | 1.7 | 60 | 100* | 100* | 100* |
| | | 1.4 | 40 | 99* | 100* | 100* |
| | | 1.4 | 60 | 90* | 100* | 100* |
| NBG-c | n.k. | n.k. | 75 | 99* | 100* | 100* |
| | | n.k. | 75 | 95* | 100* | 100* |
| X-c | | n.k. | 95 | 100* | 100* | 100* |
| | | n.k. | 95 | 100* | 100* | 100* |
| No treatment | — | — | 75* | 100* | 100* | 100* |

Footnote and Abbreviations for Table 4
*At least part of this rust was red; otherwise, all of the rust observed was white. Where it is observed, red rust signifies such extensive corrosion that the galvanized coating on the substrate is completely penetrated, allowing red iron rust to replace white corrosion products from zinc.
"NBG" means "NOVABRIGHT ® C 1005 commercial passivating product; "-c" taken from a large-scale commercial line using the treatment named at the left; "X" means a product believed to be commercial, but processed in a manner not known in detail; "n.k." means "not known"; "-" indicates "not applicable".

Example and Comparison Example GROUP 3

In this group the frictional properties of coatings formed according to the invention were evaluated. Compositions 2.0 and 2.2 from group 2 were used again, along with a Composition 3 according to the invention that had the same materials as Composition 2.2 except that the amount of ChemCor 191C30 used was doubled while the amounts of other components remained the same, and the commercial products described in Group 2 were also used again. At least two flat panels of hot-dip-galvanized steel were treated with each composition in the same general manner as described for Group 2. The treated and dried substrates were then tested for average coefficient of friction on a draw bench under a pressure of 17 bars. This test produces a graph of drawing force against time, which is functionally equivalent to distance, as the moving frictional element of the draw bench is drawn along the full length of the stationary tested panel. The drawing force typically rises very rapidly at the beginning and then remains steady or slightly declines during the remainder of the test. The peak drawing force measured during the initial rapid rise is recorded as the initial force. The entire time length of the graph is divided into four equal intervals, and the coefficients of friction corresponding to the initial drawing force and the drawing forces measured from the graph at the ends of each of the four intervals are shown in Table 5 below. Intended replicates are shown one under another in the Table, with an Average for the coating type after each group of replicates. The results indicate that the compositions according to the invention are superior in this property to the current standard commercial products, with the composition containing an intermediate amount of wax giving lower friction than the one with no wax or the higher amount.

TABLE 5

| Coating Type | Coefficient of Friction ("μ"): | | | | | Average μ for All Five Measurements |
|---|---|---|---|---|---|---|
| | Initial | Measured at the End of Interval Number: | | | | |
| | | 1 | 2 | 3 | 4 | |
| 2.0 | 0.59 | 0.44 | 0.41 | 0.65 | 0.28 | 0.51 |
| | 0.64 | 0.53 | 0.45 | 0.36 | 0.35 | 0.45 |
| | 0.76 | 0.59 | 0.53 | 0.47 | 0.42 | 0.51 |
| 2.0 Average | 0.66 | 0.52 | 0.46 | 0.50 | 0.35 | 0.42 |
| 2.2 | 0.42 | 0.42 | 0.41 | 0.40 | 0.37 | 0.41 |
| | 0.39 | 0.40 | 0.40 | 0.36 | 0.35 | 0.39 |
| | 0.42 | 0.45 | 0.46 | 0.44 | 0.42 | 0.45 |
| | 0.45 | 0.47 | 0.44 | 0.41 | 0.39 | 0.44 |
| 2.2 Average | 0.42 | 0.43 | 0.43 | 0.40 | 0.38 | 0.42 |
| 3 | 0.77 | 0.58 | 0.46 | 0.34 | 0.34 | 0.46 |
| | 0.62 | 0.59 | 0.56 | 0.55 | 0.42 | 0.56 |
| | 0.65 | 0.48 | 0.46 | 0.45 | 0.45 | 0.56 |
| 3 Average | 0.68 | 0.54 | 0.49 | 0.45 | 0.40 | 0.50 |
| NBG | 0.38 | 0.57 | 0.63 | 0.57 | 0.51 | 0.59 |
| | 0.42 | 0.42 | 0.42 | 0.44 | 0.39 | 0.43 |
| NBG-c | n.k. | 0.64 | 0.63 | 0.58 | n.k. | 0.62 |
| | n.k. | 0.59 | 0.53 | 0.41 | n.k. | 0.51 |
| NBG Avg. | 0.40 | 0.56 | 0.55 | 0.50 | 0.45 | 0.54 |
| X-c | n.k. | 0.70 | 0.76 | 0.70 | n.k. | 0.72 |
| | n.k. | 0.68 | 0.61 | 0.58 | n.k. | 0.62 |
| X-c Average | — | 0.69 | 0.69 | 0.64 | — | 0.67 |

What is claimed is:

1. A process for forming over a metal surface an adherent solid coating that imparts to the metal surface after coating at least one of the following changes: (i) protecting the surface as treated, without any additional coating, from corrosion more effectively than does the absence of any coating; (ii) improving the adhesion of a subsequently applied coating, compared to the adhesion that would be achieved between the same subsequently applied coating and the uncoated metallic surface; and (iii) allowing the treated metallic surface to be satisfactorily cold-worked without the need for any liquid organic lubricant under conditions where the metal surface if not costed can not be satisfactorily cold-worked without use of an organic liquid lubricant, said process comprising operations of: (I) coating said metal surface with a layer of an aqueous liquid composition comprising water and:
(A) a concentration of a component of dissolved phosphorus-containing anions;
(B) a concentration of a dissolved component selected from the group consisting of simple and complex anions containing fluorine atoms;
(C) a concentration of a component of dissolved and/or stably dispersed organic molecules selected from the group consisting of materials (α) and (β), and mixtures thereof wherein:
(α) consists of polymer molecules each of which has at least one unit conforming to the immediately following general formula (II):

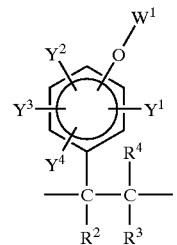

wherein:
each of $R^2$ through $R^4$ is selected, independently of each other and independently from one molecule of the component to another and from one to another unit conforming to this formula when there is more than one such unit in a single polymer molecule, from the group consisting of a hydrogen moiety, an alkyl moiety with from 1 to 5 carbon atoms, and an aryl moiety with from 6 to 18 carbon atoms;
each of $Y^1$ through $Y^4$ is selected, independently, except as noted further below, of each other and independently from one molecule of the component to another and from one to another unit of any polymer molecule conforming to this formula when there is more than one such unit in a single polymer molecule from the group consisting of: a hydrogen moiety; a —$CH_2Cl$ moiety; an alkyl moiety with from 1 to 18 carbon atoms; an aryl moiety with from 6 to 18 carbon atoms; a moiety conforming to the general formula —$CR^{12}R^{13}OR^{14}$, where each of $R^{12}$ through $R^{14}$ is selected from the group consisting of a hydrogen moiety, an alkyl moiety, an aryl moiety, a hydroxyalkyl moiety, an aminoalkyl moiety, a mercaptoalkyl moiety, and a phosphoalkyl moiety; and a moiety Z that conforms to one of the two immediately following general formulas:

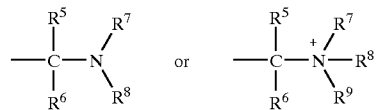

where each of $R^5$ through $R^8$ is selected, independently of each other and independently from one molecule of the component to another and from one to another unit conforming to this formula when there is more than one such unit in a single polymer molecule, from the group consisting of a hydrogen moiety, an alkyl moiety, an aryl moiety, a hydroxyalkyl moiety, an aminoalkyl moiety, a mercaptoalkyl moiety, and a phosphoalkyl moiety and $R^9$ is selected from the group consisting of a hydrogen moiety, an alkyl moiety, an aryl moiety, a hydroxy or polyhydroxy alkyl moiety, an amino or polyamino alkyl moiety, a mercapto or polymercapto alkyl moiety, a phospho or polyphospho alkyl moiety, an —$O^-$ moiety, and an —OH moiety, at least one of $Y^1$ through $Y^4$ in at least one unit of each selected polymer molecule being a moiety Z as above defined; and $W^1$ is selected, independently from one molecule of the component to another and from one to another unit conforming to this formula when there is more than one such unit in a single polymer molecule, from the group consisting of a hydrogen moiety, an acyl moiety, an acetyl moiety, a benzoyl moiety; a 3-allyloxy-2-hydroxypropyl moiety; a 3-benzyloxy-2-hydroxypropyl moiety; a 3-butoxy-2-hydroxypropyl moiety; a 3-alkyloxy-2-hydroxypropyl moiety; a 2-hydroxyoctyl moiety; a 2-hydroxyalkyl moiety; a 2-hydroxy-2-phenylethyl moiety; a 2-hydroxy-2-alkylphenylethyl moiety; a benzyl, methyl, ethyl, propyl, unsubstituted alkyl, or unsubstituted allyl, unsubstituted alkylbenzyl moiety; a halo or polyhalo alkyl, or halo or polyhalo alkenyl moiety; a moiety derived from a condensation polymerization product of ethylene oxide, propylene oxide or a mixture thereof by deleting one hydrogen atom there from; and a sodium, potassium, lithium, ammonium or substituted ammonium, or phosphonium or substituted phosphonium cation moiety; and (β) consists of polymer molecules each of which does not include a unit conforming to general formula (II) as given above but does include at least one unit corresponding to the immediately following general formula (III);

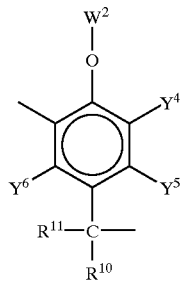

wherein:
each of $R^{10}$ and $R^{11}$ is selected, independently of each other and independently from one molecule of the component to another and from one to another unit conforming to this formula when there is more than one such unit in a single polymer molecule, from the group consisting of a hydrogen moiety, an alkyl moiety with from 1 to 5 carbon atoms, and an aryl moiety with from 8 to 18 carbon atoms;

each of $Y^4$ through $Y^6$ is selected, independently of each other and independently from one molecule of the component to another and from one to another unit of any polymer molecule conforming to this formula when there is more than one such unit in a single polymer molecule, except as noted further below, from the group consisting of: a hydrogen moiety; a —$CH_2Cl$ moiety; an alkyl moiety with from 1 to 18 carbon atoms; an aryl moiety with from 8 to 18 carbon atoms; a moiety conforming to the general formula —$CR^{12}R^{13}R^{14}$, where each of $R^{12}$ through $R^{14}$ is selected from the group consisting of a hydrogen moiety, an alkyl moiety, an aryl moiety, a hydroxyalkyl moiety, an aminoalkyl moiety, a mercaptoalkyl moiety, and a phosphoalkyl moiety; and a moiety Z as defined for material (α) above, at least one of $Y^1$ through $Y^4$ in at least one unit of each selected polymer molecule being a moiety Z as above defined; and $W^2$ is selected, independently from one molecule of the component to another and from one to another unit of any polymer molecule conforming to this formula when there is more than one such unit in a single polymer molecule, from the group consisting of a hydrogen moiety, an acyl moiety, an acetyl moiety, a benzoyl moiety; a 3-allyloxy-2-hydroxypropyl moiety; a 3-benzyloxy-2-hydnoxypropyl moiety; a 3-butoxy-2-hydroxypropyl moiety; a 3-alkyloxy-2-hydroxypropyl moiety; a 2-hydroxyoctyl moiety; a 2-hydroxyalkyl moiety; a 2-hydroxy-2-phenylethyl moiety; a 2-hydroxy-2-alkylphenylethyl moiety; a benzyl, methyl, ethyl, propyl, unsubstituted alkyl, unsubstituted allyl, or unsubstituted alkylbenzyl moiety; a halo or polyhalo alkyl, or halo or polyhalo alkenyl, moiety, a moiety derived from a condensation polymerization product of ethylene oxide, propylene oxide or a mixture thereof by deleting one hydrogen atom therefrom, and a sodium, potassium, lithium, ammonium or substituted ammonium, or phosphonium or substituted phosphonium cation moiety; the phrase "polymer molecule" in the above definitions of materials (α) and (β) including any electrically neutral molecule with a molecular weight of at least 300 daltons; and (D) a concentration of a component of dissolved, stably dispersed, or both dissolved and stably dispersed film-forming molecules, said molecules not being part of any of immediately previously recited components (A) through (C);

(E) a volume of a component comprising a cationic dispersing agent and a stable dispersed solid material, wherein said solid material in isolated form has a coefficient of static friction, measured between two pieces of the solid material itself or between the solid material and cold rolled steel, that is not greater than 0.35, the solid material not being part of any components (A) through (D);

and (II) drying into place overeat metal surface the nonvolatile contents of the liquid layer formed in operation (I), so as to form said solid coating.

2. The process according to claim 1, wherein:
the solid layer formed in operation (II) has a mass per unit area of the metal surface coated that is from about 0.2 to about 10 grams per square meter ("g/m²);
either:
component (B) includes at least one of the elements boron, silicon, titanium, zirconium, and hafnium in anions that also contain fluorine atoms, and the concentration, in a unit of moles per aqueous liquid composition volume, of the total of the elements boron, silicon, titanium, zirconium, and hafnium in the liquid composition from which a layer is formed in step (I) has a ratio to the concentration of phosphorus atoms that is stoichiometrically equivalent to the concentration of component (A) in said aqueous liquid composition, in the same unit as for component (B), that is from about 0.03:1.0 to about 2.0:1.0; or component (B) does not include any of the elements boron, silicon, titanium, zirconium and hafnium, and the concentration in moles of fluorine atoms in the liquid composition from which a layer is formed in step (I) has a ratio to the concentration in moles of phosphorus atoms that is stoichiometrically equivalent to the concentration of component (A) in the same mass of the same liquid composition that is from about 0.3:1.0 to about 7:1.0;

in said aqueous liquid composition, the concentration of component (C), in a unit of mass per aqueous liquid composition volume, has a ratio to the stoichiometrically equivalent concentration as $H_3PO_4$ of component (A), in the same unit as for component (C), that is from about 0.02:1.0 to about 2.0:1.0;

in said aqueous liquid composition, the concentration of component (D), in a unit of mass per volume of the total liquid composition, has a ratio to the concentration of component (A) in the same unit as for component (D) that is from about 0.3:1.0 to about 15:1.0; and the liquid composition also contains a volume of a component (E) of stably dispersed solid material that in isolated form has a coefficient of static friction, measured between two pieces of the solid material itself or between the solid material and cold rolled steel that is not greater than 0.35, this solid material not being part of any of components (A) through (D), the volume of component (E) in said aqueous liquid composition being such that an equal volume of high density polyethylene has a mass with a ratio to the mass of component (D) present in the same liquid composition that is from about 0.005:1.0 to about 0.40:1.0

3. The process according to claim 2, wherein:

component (A) was provided to the composition as orthophosphoric acid or at least one salt thereof;

component (B) is selected from the group consisting of anions with one of the chemical formulas $BF_4^{-1}$, $SiF_8^{-2}$, $TiF_6^{-2}$, $ZrF_6^{-2}$, and $HfF_8^{-2}$;

component (C) is selected from molecules of type (α) when:

each of $R^2$ through $R^6$, $R^{10}$, $R^{11}$, $W^1$, and $W^2$ is a hydrogen atom moiety;

each of $Y^1$ through $Y^6$ is a hydrogen atom moiety or a moiety Z;

averaged over the entire content of component (C), each polymer molecule contains a number of units corresponding to general formulas (II) as defined above that is from about 5 to about 50;

averaged over the entire content of component (C), the number of moieties Z has a ratio to the number of aromatic nuclei that is from about 0.20:1.0 to about 2.0:1.0;

averaged over the entire content of component (C), the number of polyhydroxyl moieties Z, which are defined as those moieties Z in which at least $R^8$ in the general formulas for moieties Z has (i) from 4 to 6 carbon atoms and (ii) as many hydroxyl groups, each attached to a distinct one of the carbon atoms, as one less than the number of carbon atoms in the $R^8$ moiety, has a ratio to the total number of moieties Z in the composition that is at least about 0.50:1.0; and $R^7$ is an alkyl moiety with not more than 3 carbon atoms.

4. The process according to claim 3, wherein:

the solid layer formed in operation (II) has a mass per unit area of the metal surface coated that is from about 0.80 to about 4.0 g/m²;

component (B) includes at least one of the elements boron, silicon, titanium, zirconium, and hafnium in anions that also contain fluorine atoms, and the concentration in a unit of moles per aqueous liquid composition volume of the total of the elements boron, silicon, titanium, zirconium, and hafnium in the liquid composition from which a layer is formed in step (I) has a ratio to the concentration of phosphorus atoms that is stoichiometrically equivalent to the concentration of component (A), in the same unit as for component (B), is from about 0.12:1.0 to about 0.40:1.0;

in said aqueous liquid composition, the concentration of component (C), in a unit of mass per volume, has a ratio to the stoichiometrically equivalent concentration as $H_3PO_4$ of component (A), in the same unit as for component (C), that is from about 0.08:1.0 to about 0.40:1.0;

in said aqueous liquid composition, the concentration of component (D), in a unit of mass per volume of the total liquid composition, has a ratio to the concentration of component (A) in the same unit as for component (D) that is from about 0.9:1.0 to about 4.0:1.0; and the liquid composition also contains a volume of component (E) of stably dispersed solid material that in isolated form has a coefficient of static friction, measured between two pieces of the solid material itself or between the solid material and cold rolled steel, that is not greater than 0.16, this solid material not being part of any of components (A) through (D), the volume of component (E) being such that an equal volume of high density polyethylene has a mass with a ratio to the mass of component (D) present in the same liquid composition that is from about 0.025:1.0 to about 0.10:1.0.

5. The process according to claim 4, wherein, the solid layer formed in operation (II) has a mass per unit area of the metal surface coated that is from about 1.5 to about 2.5 g/m²;

in said aqueous liquid composition, component (B) is hexafluorotitanic acid, and its concentration in a unit of moles of titanium per volume of said liquid composition has a ratio to the concentration of phosphorus atoms that is stoichiometically equivalent to the concentration of component (A), in the same unit as for component (B), that is from about 0.21:1.0 to about 0.35:1.0;

component (C) is selected from polymers of 4-vinyl phenol to which have been grafted Z moieties from reaction of formaldehyde and N-methyl glucamine, and the concentration of component (C), in a unit of mass per volume, has a ratio to the stoichiometrically equivalent concentration as $H_3PO_4$ of component (A), in the same unit as for component (C), that is from about 0.14:1.0 to about 0.35:1.0;

in said aqueous liquid composition, the concentration of component (D), in a unit of mass per volume of the total liquid composition, has a ratio to the concentration of component (A) in the same unit as for component (D) that is from about 1.5:1.0 to about 2.9:1.0; and component (E) is high density density polyethylene and has a mass with a ratio to the mass of component (D) present in the same liquid composition that is from about 0.042:1.0 to about 0.10:1.0.

6. A process for forming over a metal surface an adherent solid coating that imparts to the metal surface after coating at least one of the following changes; (i) protecting the surface as treated, without any additional coating, from corrosion more effectively than does the absence of any coating; (ii) improving the adhesion of a subsequently applied coating, compared to the adhesion that would be achieved between the same subsequently applied coating and the uncoated metallic surface; and (iii) allowing the treated metallic surface to be satisfactorily cold-worked without the need for any liquid organic lubricant under conditions where the metal surface if not coated can not be satisfactorily cold-worked without use of an organic liquid lubricant, said process comprising operations of:

(I) coating said metal surface with a layer of an aqueous liquid composition that has been made by mixing a first mass of water and:

(A) a second mass of a water soluble source of phosphorus-containing anions;

(B) a third mass of a source of water soluble anions selected from the group consisting of simple and complex anions containing fluorine atoms;

(C) a fourth mass of a component consisting of materials (α), (β), or both (α) and (β) wherein:

(α) consists of polymer molecules each of which has at least one unit conforming to the immediately following general formula (II):

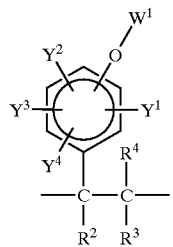

wherein:
each of $R^2$ through $R^4$ is selected, independently of each other and independently from one molecule of the component to another and from one to another unit conforming to this formula when there is more than one such unit in a single polymer molecule, from the group consisting of a hydrogen moiety, an alkyl moiety with from 1 to 5 carbon atoms, and an aryl moiety with from 6 to 18 carbon atoms;

each of $Y^1$ through $Y^4$ is selected, independently, except as noted further below, of each other and independently from one molecule of the component to another and from one to another unit of any polymer molecule conforming to this formula when there is more than one such unit in a single polymer molecule from the group consisting of: a hydrogen moiety; a —CH$_2$Cl moiety; an alkyl moiety with from 1 to 18 carbon atoms; an aryl moiety with from 6 to 18 carbon atoms; a moiety conforming to the general formula —CR$^{12}$R$^{13}$OR$^{14}$, where each of $R^{12}$ through $R^{14}$ is selected from the group consisting of a hydrogen moiety, an alkyl moiety, an aryl moiety, a hydroxyalkyl moiety, an aminoalkyl moiety, a mercaptoalkyl moiety, and a phosphoalkyl moiety; and a moiety Z that conforms to one of the two immediately following general formulas:

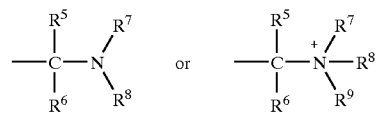

where each of $R^5$ through $R^8$ is selected, independently of each other and independently from one molecule of the component to another and from one to another unit conforming to this formula when there is more than one such unit in a single polymer molecule, from the group consisting of a hydrogen moiety, an alkyl moiety, an aryl moiety, a hydroxyalkyl moiety, an aminoalkyl moiety, a mercaptoalkyl moiety, and a phosphoalkyl moiety and $R^9$ is selected from the group consisting of a hydrogen moiety, an alkyl moiety, an aryl moiety, a hydroxy or polyhydroxy alkyl moiety, an amino or polyamino alkyl moiety, a mercapto or polymercapto alkyl moiety, a phospho or polyphospho alkyl moiety, an —O$^-$ moiety, and an —OH moiety, at least one of $Y^1$ through $Y^4$ in at least one unit of each selected polymer molecule being a moiety Z as above defined; and $W^1$ is selected, independently from one molecule of the component to another and from one to another unit conforming to this formula when there is more than one such unit in a single polymer molecule, from the group consisting of a hydrogen moiety, an acyl moiety, an acetyl moiety, a benzoyl moiety; a 3-allyloxy-2-hydroxypropyl moiety; a 3-benzyloxy-2-hydroxypropyl moiety; a 3-butoxy-2-hydroxypropyl moiety; a 3-alkyloxy-2-hydroxypropyl moiety; a 2-hydroxyoctyl moiety; a 2-hydroxyalkyl moiety; a 2-hydroxy-2-phenylethyl moiety; a 2-hydroxy-2-alkylphenylethyl moiety; a benzyl, methyl, ethyl, propyl, unsubstituted alkyl, unsubstituted allyl, or unsubstituted alkylbenzyl moiety; a halo or polyhalo alkyl, or halo or polyhalo alkenyl moiety; a moiety derived from a condensation polymerization product of ethylene oxide, propylene oxide or a mixture thereof by deleting one hydrogen atom therefrom; and a sodium, potassium, lithium, ammonium or substituted ammonium, or phosphonium or substituted phosphonium cation moiety; and (β) consists of polymer molecules each of which does not include a unit conforming to general formula (II) as given above but does include at least one unit corresponding to the immediately following general formula (III):

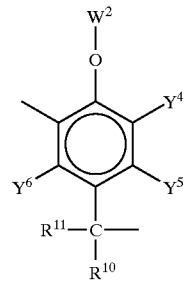

wherein:
each of $R^{10}$ and $R^{11}$ is selected, independently of each other and independently from one molecule of the component to another and from one to another unit conforming to this formula when there is more than one such unit in a single polymer molecule, from the group consisting of a hydrogen moiety, an alkyl moiety with from 1 to 5 carbon atoms, and an aryl moiety with from 6 to 18 carbon atoms;

each of $Y^4$ through $Y^6$ is selected, independently of each other and independently from one molecule of the component to another and from one to another unit of any polymer molecule conforming to this formula when there is more than one such unit in a single polymer molecule, except as noted further below, from the group consisting of: a hydrogen moiety; a —$CH_2Cl$ moiety; an alkyl moiety with from 1 to 18 carbon atoms; an aryl moiety with from 6 to 18 carbon atoms; a moiety conforming to the general formula —$CR^{12}R^{13}OR^{14}$, where each of $R^{12}$ through $R^{14}$ is selected from the group consisting of a hydrogen moiety, an alkyl moiety, an aryl moiety, a hydroxyalkyl moiety, an aminoalkyl moiety, a mercaptoalkyl moiety, and a phosphoalkyl moiety; and a moiety Z as defined for material (α) above, at least one of $Y^1$ through $Y^4$ in at least one unit of each selected polymer molecule being a moiety Z as above defined; and $W^2$ is selected, independently from one molecule of the component to another and from one to another unit of any polymer molecule conforming to this formula when there is more than one such unit in a single polymer molecule, from the group consisting of a hydrogen moiety, an acyl moiety, an acetyl moiety, a benzoyl moiety; a 3-allyloxy-2-hydroxypropyl moiety; a 3-benzyloxy-2-hydroxypropyl moiety; a 3-butoxy-2-hydroxypropyl moiety; a 3-alkyloxy-2-hydroxypropyl moiety; a 2-hydroxyoctyl moiety; a 2-hydroxyalkyl moiety; a 2-hydroxy-2-phenylethyl moiety; a 2-hydroxy-2-alkylphenylethyl moiety; a benzyl, methyl, ethyl, propyl, unsubstituted alkyl, unsubstituted allyl, or unsubstituted alkylbenzyl moiety; a halo or polyhalo alkyl, or halo or polyhalo alkenyl, moiety; a moiety derived from a condensation polymerization product of ethylene oxide, propylene oxide or a mixture thereof by deleting one hydrogen atom therefrom; and a sodium, potassium, lithium, ammonium or substituted ammonium, or phosphonium or substituted phosphonium cation moiety; and (D) a fifth mass of a source of dissolved, stably dispersed, or both dissolved and stably dispersed film-forming molecules, said fifth mass having a glass transition temperature that is not more than 75° C., said molecules not being part of any of immediately previously recited substances (A) through (C), wherein the fifth mass has a ratio to the stoichiometric equivalent mass as $H_3PO_4$ of the second mass that is from about 0.3:1.0 to about 15:1.0;

(E) a volume of a stable dispersed solid material, that in isolated form has a coefficient of static friction, measured between two pieces of the solid material itself or between the solid material and cold rolled steel, that is not greater than 0.35, the solid material not being part of any components (A) through (D); and (II) drying into place over the metal surface the non-volatile contents of the liquid layer formed in operation (I), so as to form said solid coating.

7. The process according to claim 6, wherein:

the solid layer formed in operation (II) has a mass per unit area of the metal surface coated that is from about 0.2 to about 10 grams per square meter ("$g/m^2$");

either:
substance (B) includes at least one of the elements boron, silicon, titanium, zirconium, and hafnium in anions that also contain fluorine atoms, and the third mass contains a number of moles of the total of the elements boron, silicon, titanium, zirconium, and hafnium that has a ratio to the number of moles of phosphorus atoms in said liquid composition that is from about 0.03:1.0 to about 2.0:1.0; or substance (B) does not include any of the elements boron, silicon, titanium, zirconium and hafnium, and the third mass contains a number of moles of fluorine atoms that has a ratio to the number of moles of phosphorus atoms corresponding to said second mass that is from about 0.3:1.0 to about 7:1.0;

the fourth mass has a ratio to the stoichiometrically equivalent mass as $H_3PO_4$ of the second mass that is from about 0.02:1.0 to about 2.0:1.0;

the fifth mass has a ratio to the stoichiometric equivalent mass as $H_3PO_4$ of the second mass that is from about 0.3:1.0 to about 10:1.0; and the liquid composition also contains a volume of a component (E) of stably dispersed solid material that in isolated form has a coefficient of static friction, measured between two pieces of the solid material itself or between the solid material and cold rolled steel, that is not greater than 0.35, this solid material not being part of any of components (A) through (D), the volume of component (E) being such that an equal volume of high density density polyethylene has a sixth mass with a ratio to said fifth mass that is from about 0.005:1.0 to about 0.40:1.0.

8. The process according to claim 7, wherein:

component (A) was provided to the composition as orthophosphoric acid or at least one salt thereof;

component (B) is selected from the group consisting of anions with one of the chemical formulas $BF_4^{-1}$, $SiF_6^{-2}$, $TiF_6^{-2}$, $ZrF_6^{-2}$, and $HfF_6^{-2}$;

component (C) is selected from molecules of type (α) when:
each of $R^2$ through $R^6$, $R^{10}$, $R^{11}$, $W^1$, and $W^2$ is a hydrogen atom moiety;
each of $Y^1$ through $Y^6$ is a hydrogen atom moiety or a moiety Z;
averaged over the entire content of component (C), each polymer molecule contains a number of units corresponding to general formulas (II) as defined above that is from about 5 to about 50;
averaged over the entire content of component (C), the number of moieties Z has a ratio to the number of aromatic nuclei that is from about 0.20:1.0 to about 2.0:1.0;
averaged over the entire content of component (C), the number of moieties Z in which $R^8$ in the general formulas for moieties Z has (i) from 4 to 6, carbon atoms and (ii) as many hydroxyl groups, each attached to one of the carbon atoms, as one less than the number of carbon atoms in the $R^8$ moiety has a ratio to the total number of moieties Z in the composition that is at least about 0.50:1.0; and $R^7$ is an alkyl moiety with not more than 3 carbon atoms.

9. The process according to claim 8, wherein:

the solid layer formed in operation (II) has a mass per unit area of the metal surface coated that is from about 0.80 to about 4.0 g/m$^2$;

component (B) includes at least one of the elements boron, silicon, titanium, zirconium, and hafnium in anions that also contain fluorine atoms, and the concentration in a unit of moles per aqueous liquid composition volume of the total of the elements boron, silicon, titanium, zirconium, and hafnium in the liquid composition from which a layer is formed in step (I) has a ratio to the concentration of phosphorus atoms that is stoichiometrically equivalent to the concentration of component (A), in the same unit as for component (B), is from about 0.12:1.0 to about 0.40:1.0;

in said aqueous liquid composition, the concentration of component (C), in a unit of mass per volume, has a ratio to the stoichiometrically equivalent concentration as H$_3$PO$_4$ of component (A), in the same unit as for component (C), that is from about 0.08:1.0 to about 0.40:1.0;

in said aqueous liquid composition, the concentration of component (D), in a unit of mass per volume of the total liquid composition, has a ratio to the concentration of component (A) in the same unit as for component (D) that is from about 0.9:1.0 to about 4.0: 1.0; and the liquid composition also contains a volume of component (E) of stably dispersed solid material that in isolated form has a coefficient of static friction, measured between two pieces of the solid material itself or between the solid material and cold rolled steel, that is not greater than 0.16, this solid material not being part of any of components (A) through (C), the volume of component (E) being such that an equal volume of high density polyethylene has a mass with a ratio to the mass of component (D) present in the same liquid composition that is from about 0.025:1.0 to about 0.10:1.0.

10. A process according to claim 9, wherein:

the solid layer formed in operation (II) has a mass per unit area of the metal surface coated that is from about 1.5 to about 2.5 g/m$^2$;

component (B) is hexafluorotitanic acid, and said third mass contains a number of moles of titanium that has a ratio to the number of moles of phosphorus atoms that is stoichiometrically equivalent to the stoichiometric equivalent as H$_3$PO$_4$ of said second mass that is from about 0.21:1.0 to about 0.35:1.0;

component (C) is selected from polymers of 4-vinyl phenol to which have been grafted Z moieties from reaction of formaldehyde and N-methyl glucamine, and said fourth mass has a ratio to the stoichiometric equivalent as H$_3$PO$_4$ of said second mass that is from about 0.14:1.0 to about 0.35:1.0;

said fourth mass has a ratio to the stoichiometric equivalent as H$_3$PO$_4$ of said second mass that is from about 1.5:1.0 to about 2.9:1.0; and component (E) is high density polyethylene and said sixth mass has a ratio to said fifth mass that is from about 0.042:1.0 to about 0.10:1.0.

11. The primary makeup concentrate composition that is suitable for mixing with water and, optionally, one or more other materials to produce an aqueous liquid working composition for use in a process according to claim 1, said primary make-up concentrate composition comprising water and an amount of component (A) that corresponds stoichiometrically to an amount of H$_3$PO$_4$ that constitutes at least about 20% of the total primary make-up concentrate;

at least about 0.50 moles of one or more metal atoms or boron atoms associated with fluorine atoms in an anion per kilogram of the total primary make-up concentrate;

at least about 4.0 percent of component (C) as defined in claim 1; and the volume of component (E) in the aqueous liquid composition being such that an equal volume of high density polyethylene has a mass with a ratio of component (D) present in the liquid compositions that is from about 0.005:1 to about 0.40:1.

12. The primary make-up concentrate according to claim 11, wherein:

the amount of component (A) corresponds stoichiometrically to an amount of H$_3$PO$_4$ that constitutes at least about 24% of the total primary make-up concentrate;

there is at least about 0.60 mole of one or more metal atoms or boron atoms associated with fluorine atoms in an anion per kilogram of the total primary make-up concentrate; and there is at least about 4.5 percent of component (C).

13. The primary make-up concentrate according to claim 12, wherein:

the amount of component (A) corresponds stoichiometrically to an amount of H$_3$PO$_4$ that constitutes at least about 28% of the total primary make-up concentrate;

there is at least about 0.70 mole of one or more metal atoms or boron atoms associated with fluorine atoms in an anion per kilogram of the total primary makeup concentrate;

there is at least about 5.0 percent of component (C); and component (C) is selected from molecules of type ($\alpha$) when:

each of R$^2$ through R$^8$, R$^{10}$, R$^{11}$, W$^1$, and W$^2$ is a hydrogen atom moiety;

each of Y$^1$ through Y$^8$ is a hydrogen atom moiety or a moiety Z;

averaged over the entire content of component (C), each polymer molecule contains a number of units corresponding to general formulas (II) as defined above that is from about 5 to about 50;

averaged over the entire content of component (C), the number of moieties Z has a ratio to the number of aromatic nuclei that is from about 0.20:1.0 to about 2.0:1.0;

averaged over the entire content of component (C), the number of polyhydroxy moieties Z, which are defined as those moieties Z in which at least R$^8$ in the general formulas for moieties Z has (i) from 4 to 6 carbon atoms and (ii) as many hydroxyl groups, each attached to a distinct one of the carbon atoms, as one less than the number of carbon atoms in the R$^8$ moiety, has a ratio to the total number of moieties Z in the composition that is at least about 0.50:1.0 and R$^7$ is an alkyl moiety with not more than 3 carbon atoms.

14. The primary make-up concentrate according to claim 13, wherein:

the amount of component (A) corresponds stoichiometrically to an amount of H$_3$PO$_4$ that constitutes at least about 31% of the total primary makeup concentrate;

there is at least about 0.80 mole of one or more metal atoms or boron atoms associated with fluorine atoms in an anion per kilogram of the total primary make-up concentrate; and there is at least about 5.5 percent of component (C).

15. The primary make-up concentrate according to claim 14, wherein:

$H_3PO_4$ constitutes at least about 34% of the total primary make-up concentrate;

there is at least about 0.95 mole of hexafluorotitanic acid per kilogram of the total primary makeup concentrate; and there is at least about 6.0 percent of polymers of 4-vinyl phenol to which have been grafted Z moieties from reaction of formaldehyde and N-methyl glucamine.

16. The primary makeup concentrate composition that is suitable for mixing with water and, optionally, one or more other materials to produce an aqueous liquid working composition for use in a process according to claim 1, said primary makeup concentrate composition having been made by mixing together a first mass of water and:

a second mass of a water soluble source of component (A) that corresponds stoichiometrically to a mass of $H_3PO_4$ that constitutes at least about 20% of the total primary make-up concentrate;

a third mass of a water soluble source of anions containing one metal atom or boron atom together with at least four fluorine atoms, said third mass containing at least about 0.50 moles of said metal atoms or boron per kilogram of the total primary make-up concentrate;

a fourth mass of component (C), as defined in claim 1, that constitutes at least about 4.0 percent of the total primary make-up concentrate; and the volume of component (E) in the aqueous liquid composition being such that an equal volume of high density polyethylene has a mass with a ratio of component (D) present in the liquid compositions that is from about 0.005:1 to about 0.40:1.

17. The primary make-up concentrate according to claim 16, wherein:

said second mass corresponds stoichiometrically to an amount of $H_3PO_4$ that constitutes at least about 24% of the total primary make-up concentrate;

said third mass contains at least about 0.60 mole of said metal atoms or boron per kilogram of the total primary make-up concentrate; and said fourth mass constitutes at least about 4.5 percent of component (C).

18. The primary make-up concentrate according to claim 17, wherein:

said second mass corresponds stoichiometrically to an amount of $H_3PO_4$ that constitutes at least about 28% of the total primary make-up concentrate;

said third mass contains at least about 0.70 mole of said metal atoms or boron per kilogram of the total primary make-up concentrate;

said fourth mass constitutes at least about 5.0 percent of component (C); and component (C) is selected from molecules of type (α) when:

each of $R^2$ through $R^6$, $R^{10}$, $R^{11}$, $W^1$, and $W^2$ is a hydrogen atom moiety;

each of $Y^1$ through $Y^6$ is a hydrogen atom moiety or a moiety Z;

averaged over the entire content of component (C), each polymer molecule contains a number of units corresponding to general formulas (II) as defined above that is from about 5 to about 50;

averaged over the entire content of component (C), the number of moieties Z has a ratio to the number of aromatic nuclei that is from about 0.20:1.0 to about 2.0:1.0;

averaged over the entire content of component (C), the number of polyhydroxy moieties Z, which are defined as those moieties Z in which at least $R^8$ in the general formulas for moieties Z has (i) from 4 to 6 carbon atoms and (ii) as many hydroxyl groups, each attached to a distinct one of the carbon atoms, as one less than the number of carbon atoms in the $R^8$ moiety, has a ratio to the total number of moieties Z in the composition that is at least about 0.50:1.0; and $R^7$ is an alkyl moiety with not more than 3 carbon atoms.

19. The primary make-up concentrate according to claim 18, wherein:

said second mass corresponds stoichiometrically to an amount of $H_3PO_4$ that constitutes at least about 31% of the total primary makeup concentrate;

said third mass contains at least about 0.80 mole of said metal atoms or boron atoms per kilogram of the total primary make-up concentrate; and said fourth mass constitutes at least about 5.5 percent of the total makeup concentrate.

20. The primary make-up concentrate according to claim 19, wherein:

said second mass consists of $H_3PO_4$ that constitutes at least about 34% of the total primary make-up concentrate;

said third mass contains at least about 0.95 mole of hexafluorotitanic acid per kilogram of the total primary makeup concentrate; and said fourth mass consists essentially of at least about 6.0 percent of polymers of 4-vinyl phenol to which have been grafted Z moieties from reaction of formaldehyde and N-methyl glucamine.

21. A process for forming over a metal surface an adherent solid coating that imparts to the metal surface after coating at least one of the following changes: (i) protecting the surface as treated, without any additional coating, from corrosion more effectively than does the absence of any coating; (ii) improving the adhesion of a subsequently applied coating, compared to the adhesion that would be achieved between the some subsequently applied coating and the uncoated metallic surface; and (iii) allowing the treated metallic surface to be satisfactorily cold-worked without the need for any liquid organic lubricant under conditions where the metal surface if not coated can not be satisfactorily cold-worked without use of an organic liquid lubricant, said process comprising operations of:

(I) coating said metal surface with a layer of a substantially hexavalent chromium-free, aqueous liquid composition comprising water and:

(A) a concentration of a component of dissolved phosphorus-containing anions;

(B) a concentration of a dissolved component selected from the group consisting of simple and complex anions containing fluorine atoms;

(C) a concentration of a component of dissolved and/or stably dispersed organic molecules selected from the group consisting of materials (α), (β), and mixtures thereof, wherein:

(α) consists of polymer molecules each of which has at least one unit conforming to the immediately following general formula (II):

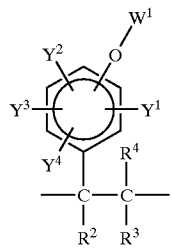

wherein:
each of $R^2$ through $R^4$ selected, independently of each other and independently from one molecule of the component to another and from one to another unit conforming to this formula when there is more than one such unit in a single polymer molecule, from the group consisting of a hydrogen moiety, an alkyl moiety with from 1 to 5 carbon atoms, and an aryl moiety with from 6 to 18 carbon atoms:

each of $Y^1$ through $Y^4$ is selected, independently, except as noted further below, of each other and independently from one molecule of the component to another and from one to another unit of any polymer molecule conforming to this formula when there is more than one such unit in a single polymer molecule from the group consisting of: a hydrogen moiety; a —$CH_2Cl$ moiety; an alkyl moiety with from 1 to 18 carbon atoms; an aryl moiety with from 6 to 18 carbon atoms; a moiety conforming to the general formula —$CR^{12}R^{13}OR^{14}$, where each of $R^{12}$ through $R^{14}$ is selected from the group consisting of a hydrogen moiety, an alkyl moiety, an aryl moiety, a hydroxyalkyl moiety, an aminoalkyl moiety, a mercaptoalkyl moiety, and a phosphoalkyl moiety; and a moiety Z that conforms to one of the two immediately following general formulas:

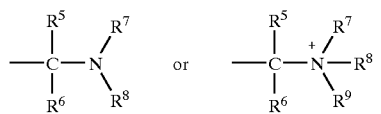

where each of $R^5$ through $R^8$ is selected, independently of each other and independently from one molecule of the component to another and from one to another unit conforming to this formula when there is more than one such unit in a single polymer molecule, from the group consisting of a hydrogen moiety, an alkyl moiety, an aryl moiety, a hydroxyalkyl moiety, an aminoalkyl moiety, a mercaptoalkyl moiety, and a phosphoalkyl moiety and $R^9$ is selected form the group consisting of a hydrogen moiety, an alkyl moiety, an aryl moiety, a hydroxy or polyhydroxy alkyl moiety, an amino or polyamino alkyl moiety, a mercapto or polymercapto alkyl moiety, a phospho or polyphospho alkyl moiety, an —$O^-$ moiety, and an —OH moiety, at least one of $Y^1$ through $Y^4$ in at least one unit of each selected polymer molecule being a moiety Z as above defined; and $W^1$ is selected, independently from one molecule of the component to another and from one to another unit conforming to this formula when ther is more than one such unit in a single polymer molecule, from the group consisting of a hydrogen moiety, an acyl moiety, an acetyl moiety, a benzoyl moiety; a 3-allyloxy-2-hydroxypropyl moiety; a 3-benzyloxy-2-hydroxypropyl moiety; a 3-butoxy-2-hydroxypropyl moiety; a 3-alkyloxy-2-hydroxypropyl moiety; a 2-hydroxyoctyl moiety; a 2-hydroxyalkyl moiety; a 2-hydroxy-2-phenylethyl moiety; a 2-hydroxy-2-alkylphenylethyl moiety; a benzyl, methyl, ethyl, propyl, unsubstituted alkyl, or unsubstituted allyl, unsubstituted alkylbenzyl moiety; a halo or polyhalo alkyl, or halo or polyhalo alkenyl moiety; a moiety derived from a condensation polymerization product of ethylene oxide, propylene oxide or a mixture thereof by deleting one hydrogen atom therefrom; and a sodium, potassium, lithium, ammonium or substituted ammonium, or phosphonium or substituted phosphonium cation moiety; and (β) consists of polymer molecules each of which does not include a unit conforming to general formula (II) as given above but does include at least one unit corresponding to the immediately following general formula (III):

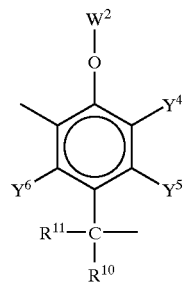

wherein:
each of $R^{10}$ and $R^{11}$ is selected, independently of each other and independently from one molecule of the component to another and from one to another unit conforming to this formula when there is more than one such unit in a single polymer molecule, from the group consisting of a hydrogen moiety, an alkyl moiety with from 1 to 6 carbon atoms, and an aryl moiety with from 6 to 18 carbon atoms;

each of $Y^4$ through $Y^6$ is selected, independently of each other and independently from one molecule of the component to another and from one to another unit of any polymer molecule conforming to this formula when there is more than one such unit in a single polymer molecule, except as noted further below, from the group consisting of: a hydrogen moiety; a —$CH_2Cl$ moiety; an alkyl moiety with from 1 to 18 carbon atoms; an aryl moiety with from 6 to 18 carbon atoms; a moiety conforming to the general formula —$CR^{12}R^{13}OR^{14}$, where each of $R^{12}$ through $R^{14}$ is selected from the group consisting of a hydrogen moiety, an alkyl moiety, an aryl moiety, a hydroxyalkyl moiety, an aminoalkyl moiety, a mercaptoalkyl moiety, and a phosphoalkyl moiety; and a moiety Z as defined for material (α) above, at least one of $Y^1$ through $Y^4$ in at least one unit of each selected polymer molecule being a moiety Z as above defined; and $W^2$ is selected, independently from one molecule of the component to another and from one to another unit of any polymer molecule conforming to this formula when there is more than one such unit in a single polymer molecule, from the group consisting of a hydrogen moiety, an acyl moiety, an acetyl moiety, a benzoyl moiety; a 3-allyloxy-2-hydroxypropyl moiety; a 3-benzyloxy-2-hydroxypropyl moiety; a 3-butoxy-2-hydroxypropyl moiety; a 3-alkyloxy-2-hydroxypropyl moiety; a 2-hydroxyoctyl moiety; a 2-hydroxyalkyl moiety; a 2-hydroxy-2-phenylethyl moiety; a 2-hydroxy-2-alkylphenylethyl moiety; a benzyl, methyl, ethyl, propyl, unsubstituted alkyl, unsubstituted allyl, or unsubstituted alkylbenzyl moiety; a halo or polyhalo alkyl, or halo or polyhalo alkenyl, moiety; a moiety derived from a condensation polymerization product of ethylene oxide, propylene oxide or a mixture thereof by deleting one hydrogen atom therefrom; and a sodium, potassium, lithium, ammonium or substituted ammonium, or phosphonium or substituted phosphonium cation moiety;

the phrase "polymer molecule" in the above definitions of materials (α) and (β) including any electrically neutral molecule with a molecular weight of at least 300 daltons; and (D) a concentration of a component of dissolved, stably dispersed, or both dissolved and stably dispersed film-forming molecules, said molecules not being part of any of immediately previously recited components (A) through (C);

wherein in said aqueous liquid composition, the concentration of component (C), in a unit of mass per aqueous liquid composition volume, has a ratio to the stoichiometrically equivalent concentration as $H_3PO_4$ of component (A), in the same unit as for component (C), that is from about 02:1.0 to about 1.0:1.0; and (II) drying into place over the metal surface the non-volatile contents of tho liquid layer formed in operation (I), so as to form said solid coating.

* * * * *

UNITED STATES PATENT AND TRADEMARK OFFICE
CERTIFICATE OF CORRECTION

PATENT NO.    : 6,802,913 B1
DATED         : October 12, 2004
INVENTOR(S)   : Goodreau et al.

It is certified that error appears in the above-identified patent and that said Letters Patent is hereby corrected as shown below:

Column 23,
Line 58, delete "costed" and insert -- coated --.

Column 25,
Line 23, delete "there from" and insert -- therefrom --.

Column 26,
Line 15, delete "hydnoxypropyl" and insert -- hydroxypropyl --.
Line 47, delete "overeat" and insert -- over the --.

Column 27,
Line 38, delete "SIF$_8^{-2}$" and "HfF$_8^{-2}$" and insert -- SiF$_6^{-2}$ -- and -- HfF$_6^{-2}$ --.

Column 28,
Line 60, delete one instance of "density".

Column 32,
Line 35, delete one instance of "density".

Column 33,
Line 27, delete "4.0: 1.0" and insert -- 4.0:1.0 --.

Column 36,
Line 56, delete "form" and insert -- from --.

Column 38,
Line 1, delete "ther" and insert -- there --.

UNITED STATES PATENT AND TRADEMARK OFFICE
CERTIFICATE OF CORRECTION

PATENT NO. : 6,802,913 B1
DATED : October 12, 2004
INVENTOR(S) : Goodreau et al.

It is certified that error appears in the above-identified patent and that said Letters Patent is hereby corrected as shown below:

Column 40,
Line 20, delete "tho" and insert -- the --.

Signed and Sealed this

Sixteenth Day of May, 2006

JON W. DUDAS
*Director of the United States Patent and Trademark Office*